(12) United States Patent
Lafontaine

(10) Patent No.: US 9,309,056 B2
(45) Date of Patent: Apr. 12, 2016

(54) AUTOMATED CASE ORDER SEQUENCING METHOD AND SYSTEM

(75) Inventor: Daniel R. Lafontaine, Vaudreuil-Dorion (CA)

(73) Assignee: 3584925 CANADA INC (DRL SYSTEMS), Vaudreuil-Dorion, Quebec (CA)

( * ) Notice: Subject to any disclaimer, the term of this patent is extended or adjusted under 35 U.S.C. 154(b) by 62 days.

(21) Appl. No.: 13/996,435

(22) PCT Filed: Dec. 20, 2011

(86) PCT No.: PCT/CA2011/001400
§ 371 (c)(1),
(2), (4) Date: Sep. 27, 2013

(87) PCT Pub. No.: WO2012/083437
PCT Pub. Date: Jun. 28, 2012

(65) Prior Publication Data
US 2014/0014467 A1    Jan. 16, 2014

Related U.S. Application Data

(60) Provisional application No. 61/457,064, filed on Dec. 20, 2010.

(51) Int. Cl.
*B65G 1/04* (2006.01)
*B65G 37/00* (2006.01)
*G05B 15/00* (2006.01)
*B65G 1/137* (2006.01)
*B65G 43/10* (2006.01)

(52) U.S. Cl.
CPC .............. *B65G 37/00* (2013.01); *B65G 1/0485* (2013.01); *B65G 1/1378* (2013.01); *B65G 43/10* (2013.01); *G05B 15/00* (2013.01)

(58) Field of Classification Search
CPC ....... B65G 43/10; B65G 1/0485; B65G 1/026
See application file for complete search history.

(56) References Cited

U.S. PATENT DOCUMENTS

| | | | | |
|---|---|---|---|---|
| 3,616,944 A | * | 11/1971 | Field | B65G 1/1378 193/36 |
| 3,622,020 A | * | 11/1971 | Sarvary | 414/279 |
| 3,712,484 A | * | 1/1973 | Wahlbeg | B65G 47/50 198/349.9 |
| 4,304,521 A | * | 12/1981 | Hammond | 414/807 |
| 5,350,050 A | * | 9/1994 | Franke | B65G 1/06 198/347.1 |
| 5,564,879 A | * | 10/1996 | Noguchi | B65G 1/0485 198/348 |
| 5,953,234 A | * | 9/1999 | Singer | B65G 1/0485 414/789.6 |
| 6,028,532 A | * | 2/2000 | Tsurumoto | B23Q 41/02 198/349 |
| 6,116,842 A | * | 9/2000 | Harris | B65G 1/0485 414/529 |
| 6,340,085 B1 | * | 1/2002 | Huber et al. | 198/782 |
| 6,435,328 B1 | * | 8/2002 | Hammond | 193/35 SS |
| 7,097,045 B2 | * | 8/2006 | Winkler | B65G 1/1378 209/630 |
| 7,331,440 B2 | * | 2/2008 | Lafontaine | B65G 1/08 198/347.4 |
| 7,380,651 B2 | * | 6/2008 | Lafontaine | B65G 37/02 193/25 FT |
| 7,963,384 B2 | * | 6/2011 | Lafontaine | B65G 1/1378 198/347.4 |

(Continued)

*Primary Examiner* — Gene Crawford
*Assistant Examiner* — Thomas Randazzo
(74) *Attorney, Agent, or Firm* — Equinox IP; Franz Bonsang

(57) ABSTRACT

A system and method for automatically preparing client orders in a distribution facility, where the inputs to the system are complete pallets of cases of individual products and the outputs of the system are client order pallets of mixed products. Specifically, the methods and systems are for conveying, storing, and dispensing cases using automated case order sequencing typically using non-product-dedicated and non-accumulating buffer conveyors.

30 Claims, 17 Drawing Sheets

(56) References Cited

U.S. PATENT DOCUMENTS

2006/0158043 A1* 7/2006 Brouwer ................. B65B 25/22
307/149

2007/0059132 A1* 3/2007 Akamatsu et al. ............ 414/274
2011/0058926 A1* 3/2011 Winkler ..................... 414/795.4
2011/0097182 A1* 4/2011 Schmit ................ B65G 1/0407
414/277

* cited by examiner

AUTOMATED CASE ORDER SEQUENCING METHOD AND SYSTEM

FIELD OF THE INVENTION

The present invention relates to order sequencing methods and systems, and more particularly to an automated case order sequencing method and system.

The invention relates to an improved system and method for automatically preparing client orders in a distribution facility, where the inputs to the system are complete pallets of cases of individual products and the outputs of the system are client order pallets of mixed products. Specifically, this invention relates to methods and systems for conveying, storing, and dispensing cases.

BACKGROUND OF THE INVENTION

The standard and most common method of preparing orders of products is manual picking of orders by workers, where the source pallets are located in static racking and employees follow a circuit through the racking and individually pick products from the source pallet and transfer them onto a client pallet. There are a number of variations on this basic method. There are several disadvantages to manual picking which have driven the development of automated systems, such as:

Low productivity;
Difficulty in finding or retaining labor in some markets;
Workplace injuries resulting from the inherently non-ergonomic task of manual picking;
High cost of manual picking errors; breakage and shrinkage;
Poor use of physical space.

There are on the other hand several key advantages to manual order picking that have to be weighted when considering automation, such as:

Low capital cost (forklifts and racking);
High Reliability;
Easily scalable;
Product flexibility.

Despite considerable intellectual property in the field and a healthy number of competitors, there is small market penetration for automated case order preparation. The key factors weighed when considering such systems are:

High cost;
Poor reliability due to high complexity;
Poor space utilization.

Accordingly, there is a need for an improved automated case order sequencing method and system that can meet the cost, reliability and space utilization requirements of the market.

SUMMARY OF THE INVENTION

It is therefore a general object of the present invention to provide an improved automated case order sequencing method and system that solve the above-mentioned problems.

The present automated case order sequencing method and system is typically used in a distribution center to prepare a selection of cases/boxes of different products corresponding to customer orders.

Customer orders are usually composed of pallet quantities of a selection of cases. The sequences of cases produced according to this invention would be palletized onto pallets, loaded onto delivery trucks, and delivered to a customer.

The process inputs are pallets of cases as they are received from the manufacturing plant and the process outputs are sequences of cases, corresponding to the requirements of a customer's order.

The preferred method for automated case sequencing, especially for higher moving products is the case buffering and dispensing method, which generally consists of a number of case guides, replenished typically in layer quantities, and featuring a dispensing apparatus which is connected to a sequencing conveyor. The actuation of the dispensing apparatus in a predetermined order releases cases on the sequencing conveyor in the desired sequence to fulfill client orders.

Slower moving products use case AS/RS (Automated Storage and Retrieval System) as the preferred method, because this method has a very low fixed cost per product. The weakness of this technology is rate; therefore effort in the industry has been made to develop special configurations of these systems to improve their rates. However these technologies are still limited to slower moving products.

The buffering and dispensing method has a very high cost per product, but can handle high throughput, i.e. it is very good at automating high moving products. A number of efforts have been made to lower the cost of these technologies and improve their space efficiency while still allowing maintenance access to their many moving parts.

If the buffering and dispensing technology could be made less expensive and with lower space requirements, it could be economical to fully automate more than just the higher moving products.

The goal of the invention is therefore to provide an improved system and method of buffering and dispensing in order to achieve lower cost per product and higher space efficiency, maintaining the high rates expected of this type of technology, and therefore enabling the cost-effective inclusion of slower moving products in the order automation system.

As advantages, the present invention addresses the shortcomings of existing order sequencing systems and methods in the following ways:

1) Non-accumulating conveyors
   a) minimized damage to products and packaging because there is no product to product contact, or pressure between products, no slippage of product on conveyor surface, no rubbing on side guide rails.
   b) improved conveying reliability and product tracking because products cannot rotate, skew or drift off the conveying path centerline or rub and hang up on side rails. Conveying is not affected by environmental conditions such as humidity or dust.
   c) less noisy than traditional roller conveyor.
   d) particular benefit of a chain based output conveyor is to enable the use a roller transfer this results in improved product dispensing reliability because products dispensed are deposited on a stopped chain conveyor. The merge is more reliable, less sensitive to product conditions and gentler on the products. Product dispensing reliability can be further improved with the use of a powered roller transfer to output chain conveyors, because the products are transferred under power and positive position control.
   e) lower capital costs lower operational costs: preventive maintenance and energy use
   f) smaller space requirements
   g) no case handling functionality compromises
2) 90 degree case transfer method
   a) gentle, low impact transfer between buffer conveyor and output transport conveyor b) is simpler and more cost-effective than what is known in the art and has performance advantages.
c) fewer and simpler components
d) more compact
e) no wear parts
f) no separate motor for the each buffer conveyor case transfer device
g) in one embodiment, the merge requires no power 3) Maintenance is made easier by minimizing the number of moving parts, utilizing parts that wear very little, and making maintenance access a priority; every moving part and every case within human reach of an access aisle.

4) Robustness is achieved in the design by making use of high-strength, low wear parts and by keeping the moving parts count low.

5) Dynamic slotting advantages:
   For a given quantity of replenishment, dynamic product slotting can reduce the required length of buffer conveyors by up to 40% while the number of case transfer devices will typically increase by only 20%. This leads to a significant reduction of the overall size and cost of the system.
   For a given buffer conveyor length, the replenishment quantity can be greatly increased, up to twice the quantity of a non-dynamic lane assignment method. This allows for the optimization of upstream partial pallet handling systems.
   This method enables the use of non-accumulating case buffer conveyors that can be more cost effective than accumulating conveyors.

6) Advantages of a common input and output conveyor:
   Avoids the cost of an input case transfer device.
   Facilitates access to the buffer conveyors because access aisles can be created between groups of buffer conveyors, these access aisles being open and accessible at the end of the buffers that is not serviced by the common input and output conveyor.
   Facilitates maintenance and repair, because most of the moving parts and those most likely to require intervention are located at one end of the case dispensing system, where the input and output conveyor is located.

Other Advantages:
1) The system and methods described, although they mention cases, could equally store and dispense totes or bins and could be scaled up and applied to full layers and even full pallets.
2) In a preferred embodiment the input case conveyor, the buffer conveyors, or the output transport conveyor or the input transport conveyor are each comprised of a plurality of chains.
3) The ability for buffer conveyors to be loaded with different skus (stock keeping units) at the same time, which entails that the replenishment unit be less than the length of the buffer conveyors.
4) Product orientation flexibility due to chain conveying: cases can be conveyed, stored and dispensed as to maximize their storage densities.
5) Post-sortation is integrated in the dispensing system.

According to an aspect of the present invention, there is provided a system of non-accumulating case conveyors and guides for storing and selectively dispensing cases of products according to predetermined order sequences, the system comprising:
  a plurality of non-accumulating buffer conveyors being substantially parallel to one another for accumulating at least one case of a respective said products;
  an output sequencing transport conveyor being locally substantially perpendicular to a respective downstream end of the non-accumulating buffer conveyors for sequentially transferring cases of the products therefrom;
  for each said plurality of non-accumulating buffer conveyors, a case transfer device connecting to the downstream end of respective said non-accumulating buffer conveyor for selectively transferring a case of the products therefrom, each said case transfer device having a respective downstream end thereof connecting to the output sequencing transport conveyor for selectively transferring the corresponding case of products thereon;
  a controller unit connecting to the plurality of non-accumulating buffer conveyors, the plurality of case transfer devices and the output sequencing transport conveyor to control respective operation thereof so as to allow the forming of the predetermined order sequences of cases of products on the output sequencing transport conveyor from the cases of respective products from the plurality of the non-accumulating buffer conveyors.

According to another aspect of the present invention, there is provided a method for the replenishment of a plurality of buffer conveyors with cases of one of a plurality of products, each said buffer conveyor having cases of a respective one said plurality of products thereon for the selective output of said cases onto an output device according to predetermined order sequences, the method comprising the steps of:
  a) queuing one said buffer conveyor onto a list of empty ones of said buffer conveyors available for replenishment by cases of one of the plurality of products after said one said buffer conveyor dispenses a last one of the cases located thereon;
  b) determining a next one of said plurality of products required to be stored on one said empty buffer conveyor from the list, said next one of said plurality of products being determined based on the predetermined batches of cases;
  c) adding a replenishment quantity of cases of said next one of said products;
  d) selecting said one said empty buffer conveyor from the list for replenishment thereof with cases of said next one of said plurality of products.

According to another aspect of the present invention, there is provided a method for storing cases of products on a plurality of powered non-accumulating buffer conveyors being substantially parallel to one another, and selectively dispensing the cases of products according to predetermined order sequences, each said buffer conveyor accumulating at least one case of a respective said products, and wherein at least two of said buffer conveyors connect to a common drive shaft selectively engaging said at least one buffer conveyor located along a shaft axis.

According to another aspect of the present invention, there is provided a system for replenishing and selectively dispensing cases of a plurality of products according to predetermined order sequences, the system comprising:
  a plurality of buffer conveyors being substantially parallel to one another, each said buffer conveyor accumulating at least one case of a respective said product;
  an output sequencing transport device operatively connecting to a respective downstream end of the at least one buffer conveyors for sequentially transferring cases of the products therefrom to form the predetermined order sequences of cases of products from the cases of respective products from the plurality of the at least one buffer conveyors;

a controller unit connecting to the plurality of buffer conveyors and the output sequencing transport device to control respective operation thereof; said controller unit queuing one said buffer conveyor onto a list of empty ones of said buffer conveyors available for replenishment by cases of one of the plurality of products after said one said buffer conveyor dispenses a last one of the cases located thereon, and, based on the predetermined sequences of cases, said controller unit determining a next one of said plurality of products required to be stored on one said empty buffer conveyor from the list, and selecting said one said empty buffer conveyor from the list for replenishment thereof with cases of said next one of said plurality of products.

According to another aspect of the present invention, there is provided a method for storing cases of products on a plurality of powered non-accumulating buffer conveyors being substantially parallel to one another, and selectively dispensing the cases of products onto a powered output sequencing transport conveyor according to predetermined order sequences, each said buffer conveyor accumulating at least one case of a respective said products, the output sequencing transport conveyor being locally substantially perpendicular to a respective downstream end of the at least one non-accumulating buffer conveyors for sequential transferring of cases of the products therefrom using, for each said plurality of buffer conveyors, a powered case transfer device connecting to the downstream end of respective said at least one non-accumulating buffer conveyor for selectively transferring a case of the products therefrom, each said case transfer device having a respective downstream end thereof connecting to the output sequencing transport conveyor for selectively transferring the corresponding case of products thereon, the method comprising, for dispensing each predetermined order sequence of cases of products, the steps of:

a) for each case of the predetermined order sequence, deactivating the output sequencing transport conveyor when a pre-assigned empty location for receiving a predetermined one of the cases of product thereon is aligned with a corresponding one of the at least one non-accumulating buffer conveyor having the predetermined one of the cases of product stored thereon;

b) activating the corresponding one of the at least one non-accumulating buffer conveyor and the corresponding case transfer device for transferring the predetermined one of the cases of product on the pre-assigned empty location of the output sequencing transport conveyor;

c) deactivating the corresponding one of the at least one non-accumulating buffer conveyor and the corresponding case transfer device;

d) activating the output sequencing transport conveyor until a second pre-assigned empty location for receiving a predetermined one of the cases of product thereon is aligned with a corresponding one of the at least one non-accumulating buffer conveyor having the predetermined one of the cases of product stored thereon.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

Figure 1:
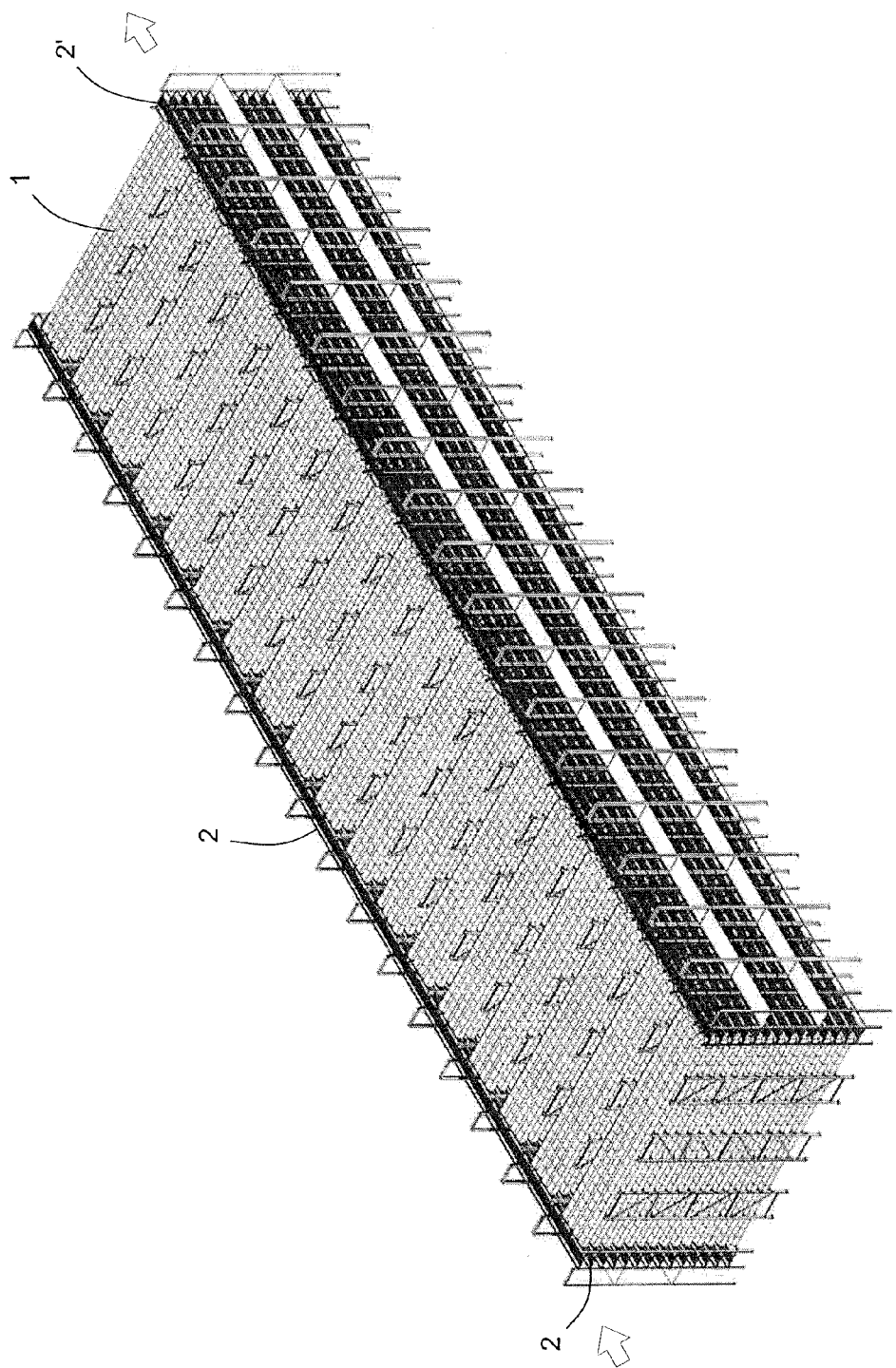
FIG. 1 is a top perspective view of an embodiment of an overall system of case buffer conveyors 1 for storing and selectively dispensing cases of products according to predetermined order sequences in accordance with the present invention. This embodiment is replenished by input conveyors 2, and the cases are dispensed out on the output conveyors 2.

2) independent solenoid device 14 to engage the lever;

3) powered rollers 15 to transfer case between the input conveyor and the case buffer conveyor;

4) powered rollers driven by the same common drive shaft 16 that is used to power the respective case buffer conveyors;

5) a particular case buffer conveyor and its associated case transfer device are engaged simultaneously via a single engagement/clutch system actuated by a solenoid; and 6) the input conveyor 2 is comprised of two or more chains (embodiment in figure shows four chains 18) and has a drive end using a drive shaft 19 to drive all of the chains 18 and individual idler sprockets 19' and tensioners at the other end (not shown).

Figure 8:
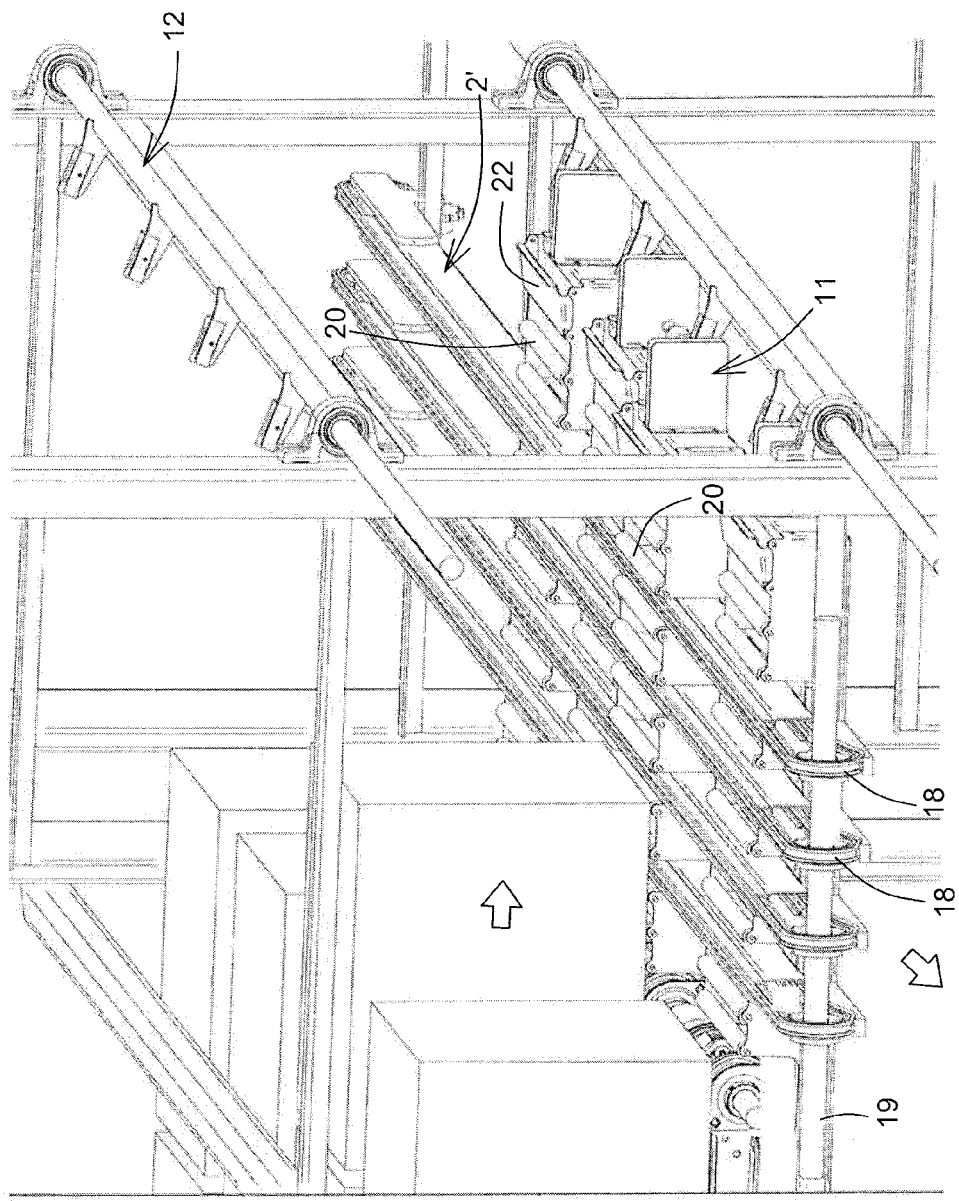

FIG. 8 is a broken enlarged top perspective view showing a case transfer device 11 that uses non-powered rollers 20 to dispense cases from the buffer conveyor 1 to the output conveyor 2'; also uses a skid plate device 22 to stop a case and prevent case bounce-back. It can use a common lifting apparatus 12. This figure also shows the output conveyor 2'. The output conveyor is comprised of two or more chains 18 (embodiment in figure shows four chains) and has a drive end using a drive shaft 19 to drive all of the chains and individual idler sprockets and tensioners at the other end (not shown).

Figure 9:
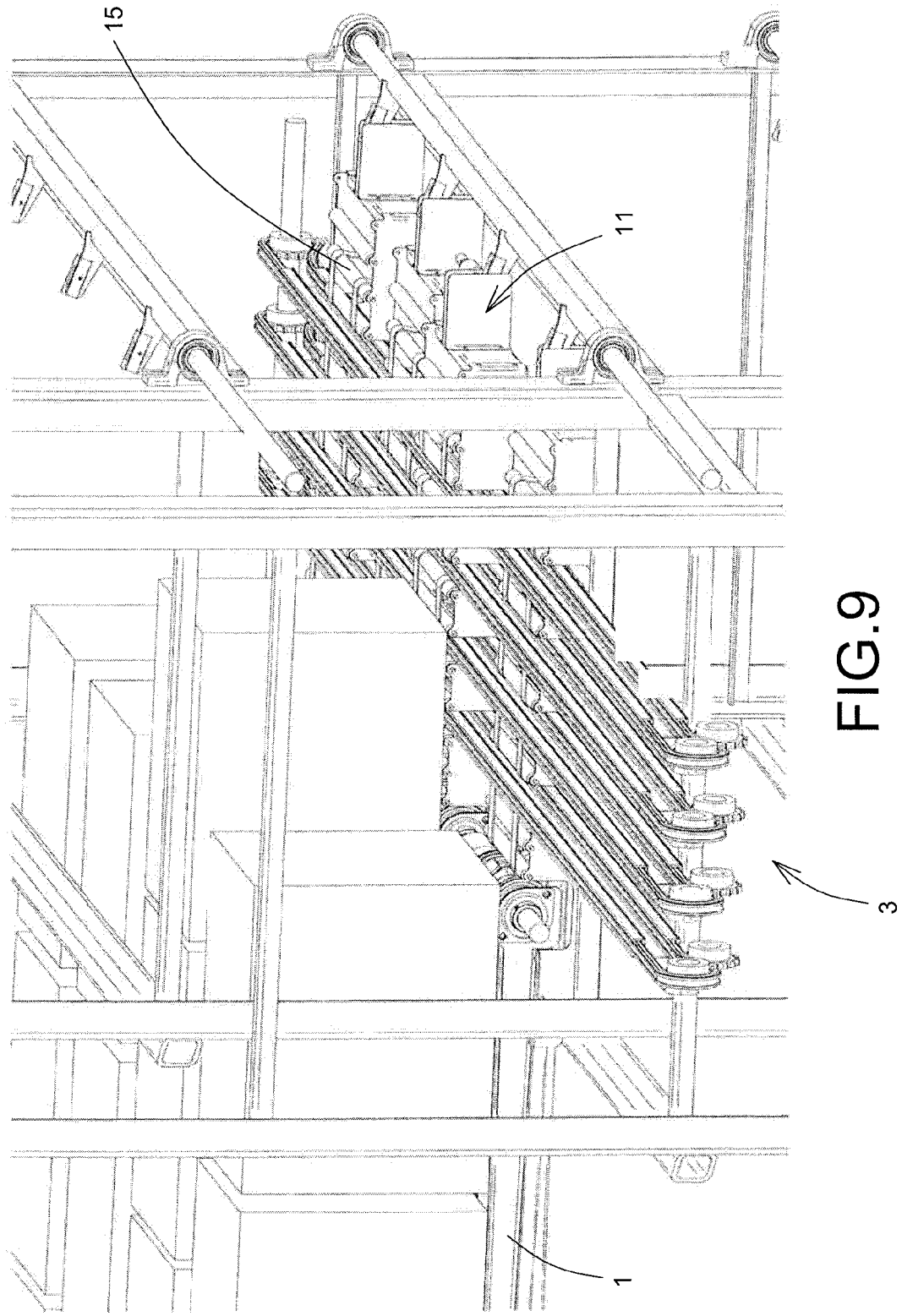

FIG. 9 is a broken enlarged top perspective view showing a dedicated powered case transfer device 11 with its powered rollers 15. It can also be used to perform transfers in both directions when the input and output conveyor 3 is a common conveyor.

Figure 10:
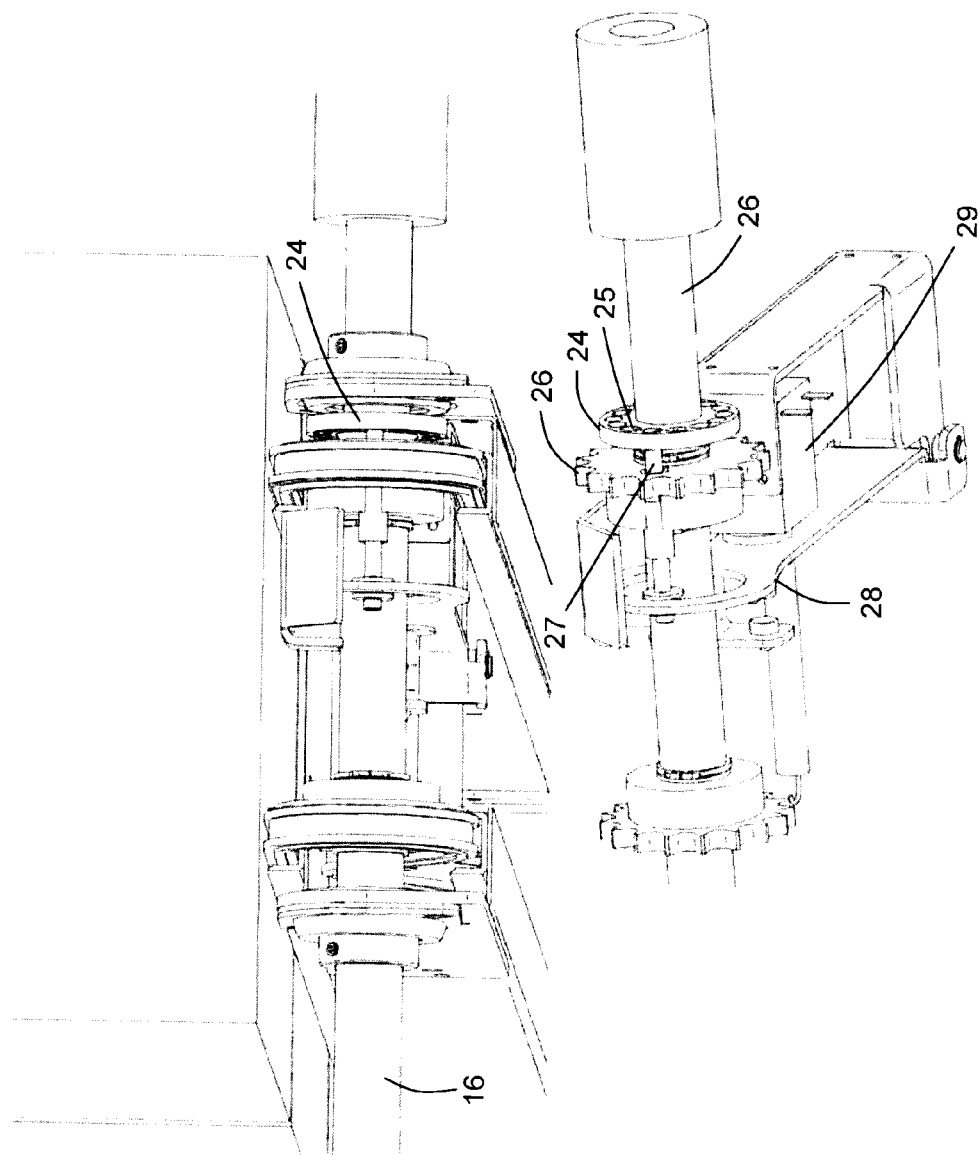

FIG. 10 are broken enlarged left and right bottom perspective views showing a common shaft drive engagement device: A disk 24 with at least one engagement hole 25 or slot is permanently fixed to the common drive shaft 16. An adjacent drive sprocket 26 contains an engagement pin 27 which when extended engages into hole or slot in said disk. The pin is connected to an actuation arm 28 which has a circular hole concentric with the common shaft. The pin is constrained within the hole and thus can be moved axially while rotating around the common shaft when engaged. In a preferred embodiment, the actuation arm is actuated by a low-powered solenoid 29 and return spring.

Figure 11:
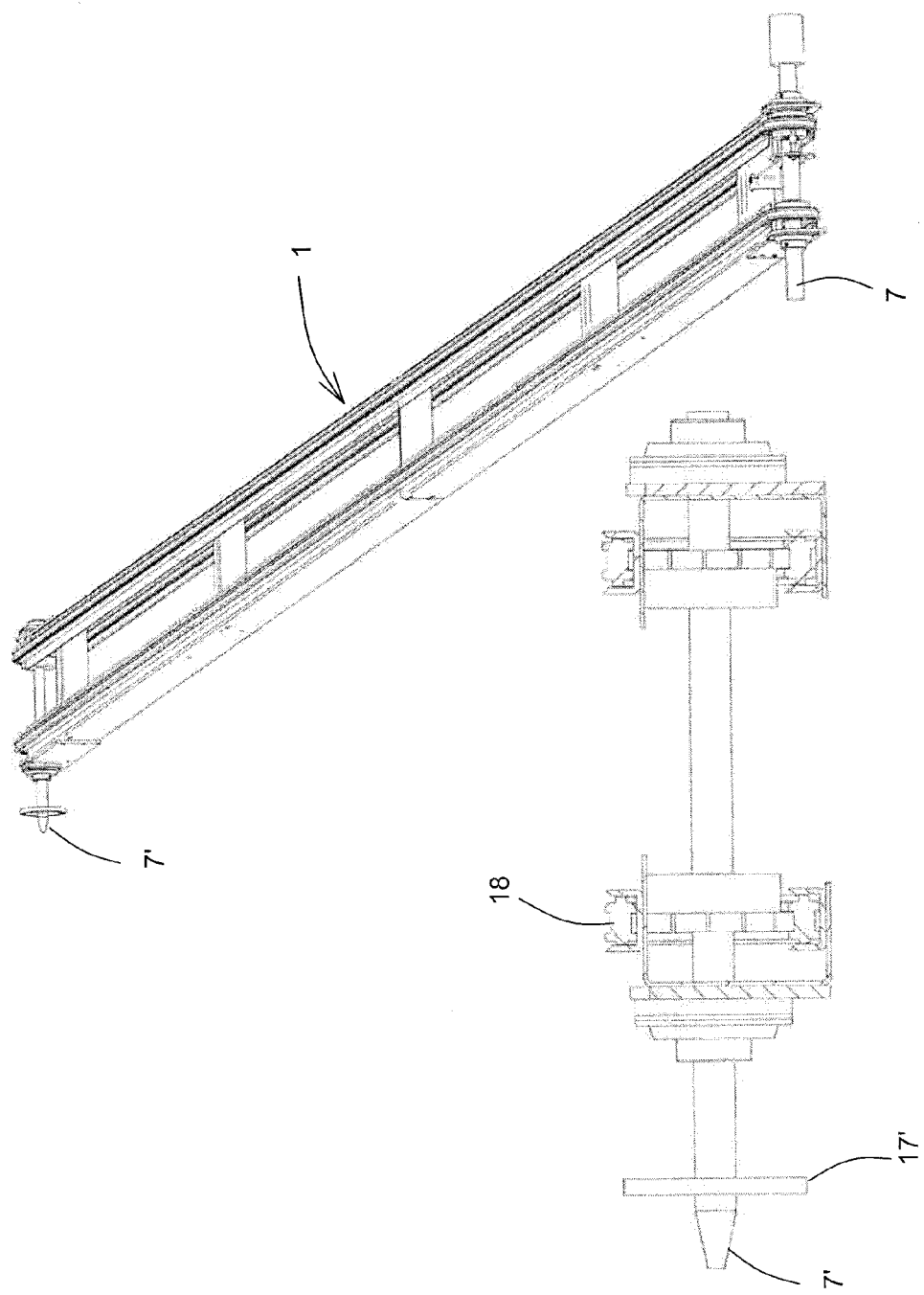

FIG. 11 are enlarged front elevation and top perspective views showing a powered buffer conveyor 1, comprised of the following:

1) Two or more chains.

2) Optional shroud/support plates (not shown): the shrouds are composed of thin metal or plastic plates that would sit between the chains of a buffer conveyor and between the buffer conveyors in order to bridge and close the gaps and thus creating a more or less solid surface between levels. Support plates (not shown) are tabs or metal strips that would clip between the chains of a buffer conveyor to increase the surface area on which products would rest, akin to a tank tread.

3) Tensioners (not shown) are used to control the pre-tensioning and to compensate for chain stretch. Two types of tensioners can be used:

a) central: used if both front and rear common shaft drives are used.

b) end: used if only one common shaft drive is used and is positioned at the end opposite the common shaft.

4) Guide supporting structures: at each end of the guides a supporting structure is designed to accommodate the case transfer devices, displaceable case transfer devices, and input and output conveyors (not shown).

5) Intermediate supports between buffer conveyor ends comprised of standard simple low-cost racking structures (not shown).

6) The common shaft case buffer drive system 7.

Figure 5:
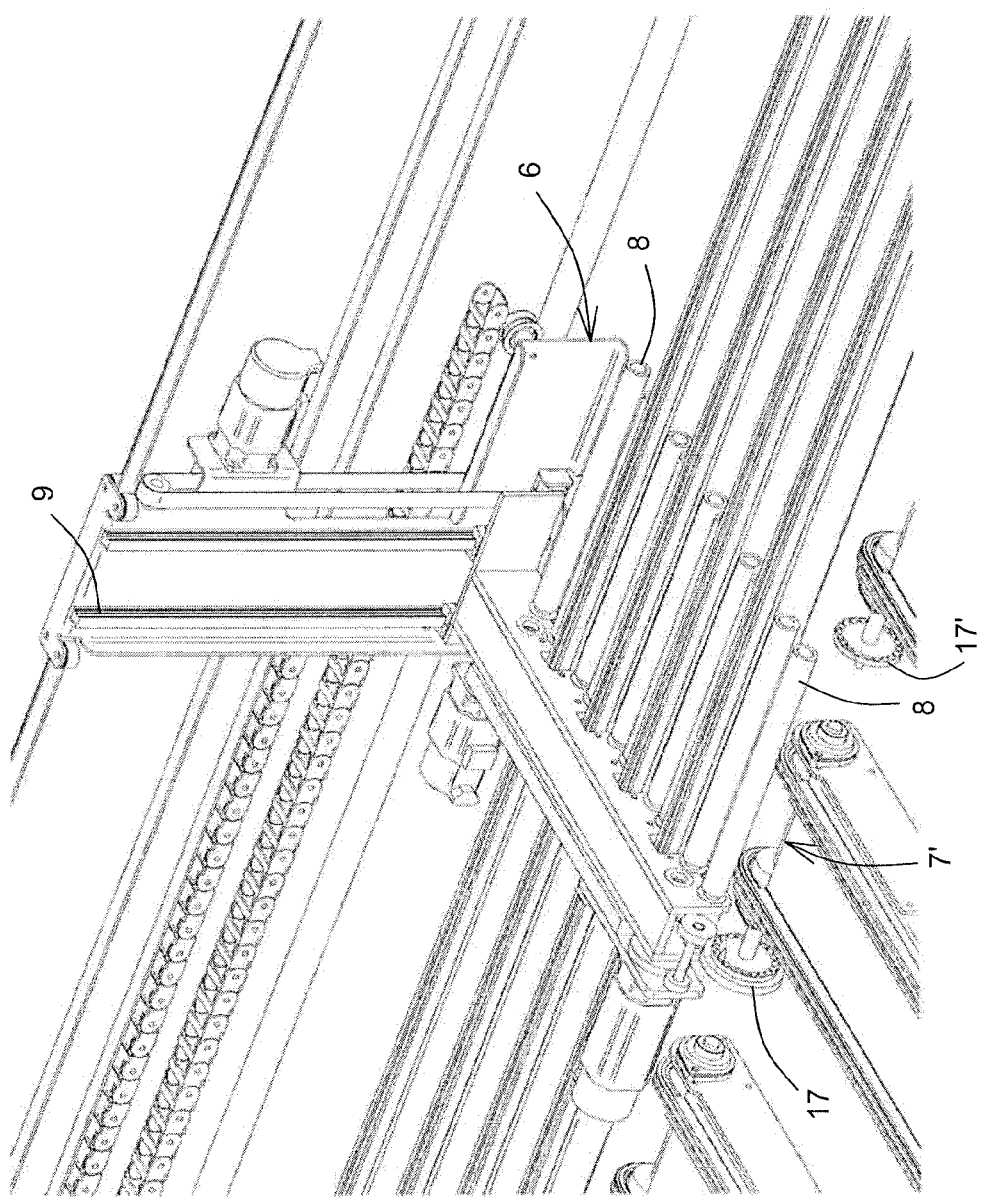
FIG. 5 is a broken enlarged top perspective view showing the displaceable case transfer device 6 and case buffer conveyor drive system 7' and engagement/clutch mechanism 17 which engages with engagement hub 17'; also showing the displaceable case transfer device powered drive rollers 8 and the vertical axis guides 9 and drive system.

7) The case buffer drive system 7' that is powered by the displaceable case transfer device 6 (as shown in FIG. 5).

Figure 12:
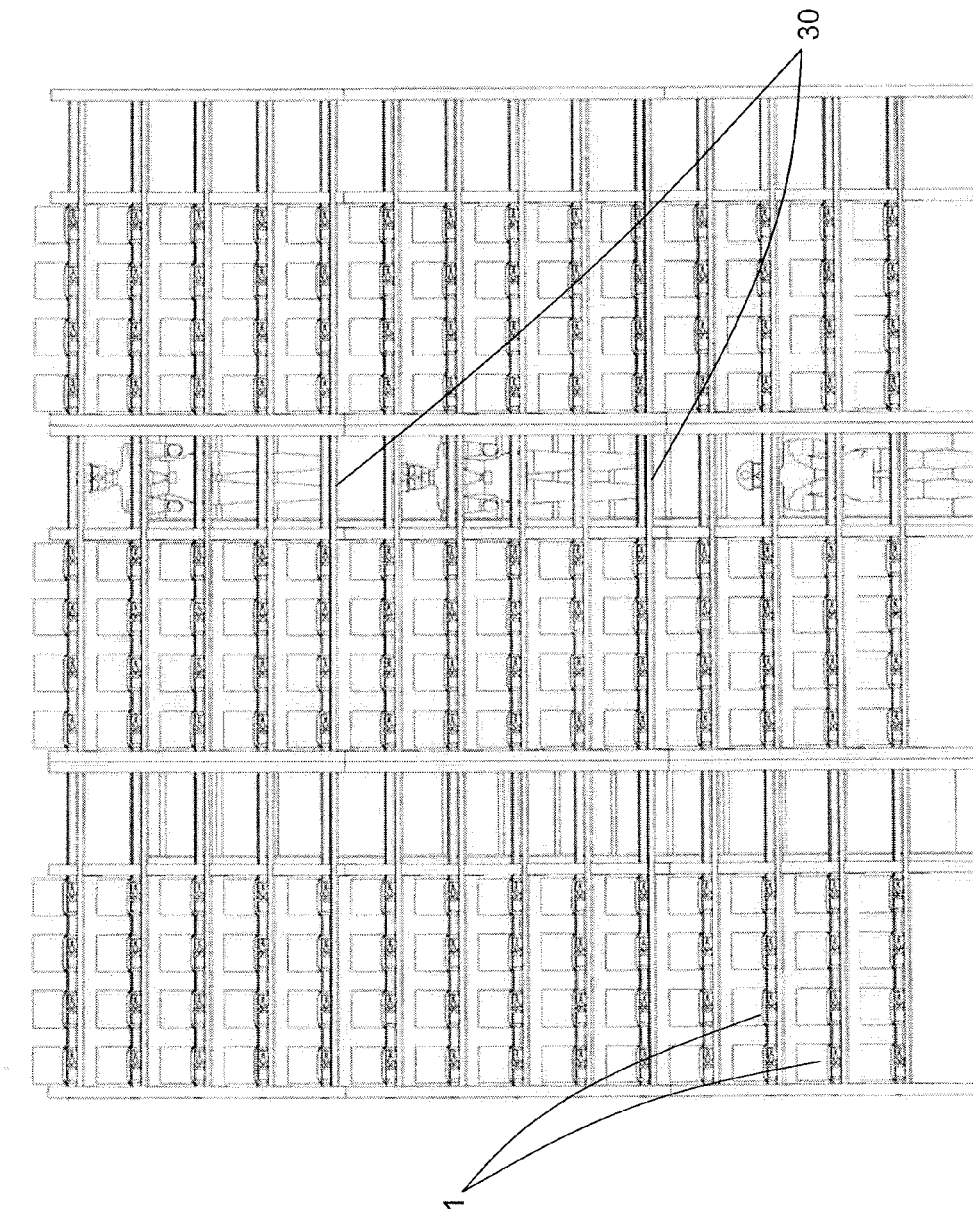

FIG. 12 is a partially broken enlarged elevation view of an embodiment of a fourteen-level system whereby the lanes are grouped horizontally with access spaces provided between each grouping. The number of lanes in a grouping is designed to allow maintenance personnel to reach the mid-point between two successive access aisles. A mezzanine 30 is provided vertically every six to eight feet, putting every piece of the equipment within manual reach.

Figure 13:
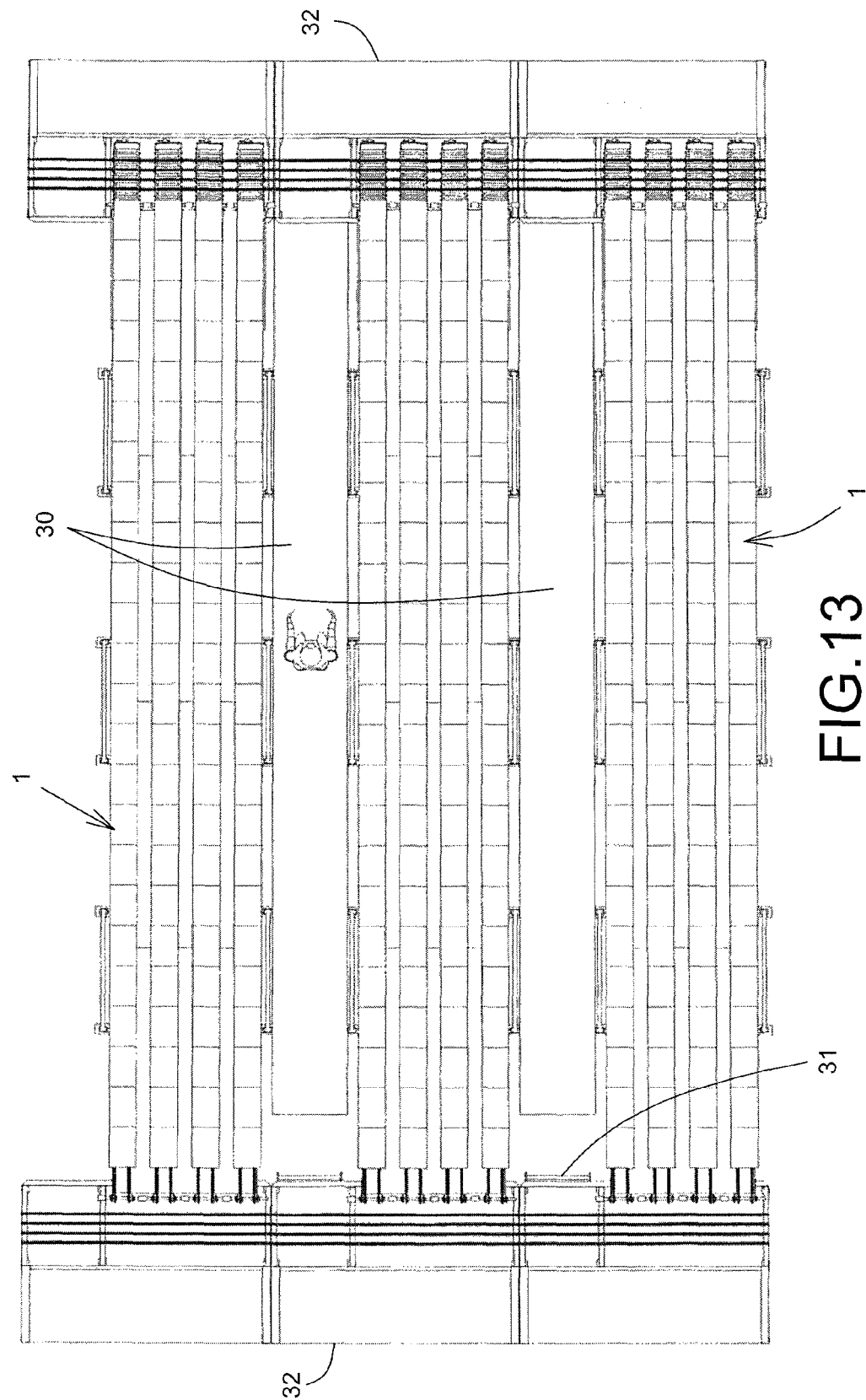

FIG. 13 is an enlarged top plan view of an embodiment of the system, with a person or operator shown on a mezzanine 30 between lane groupings. At one end of the mezzanine is a ladder 31 access, provided to access each mezzanine level. Perimeter mezzanines 32 are also provided at each end of the buffer conveyors 1 at the same levels as the internal mezzanines, thereby allowing convenient maintenance access to all moving parts of the system.

Figure 14:
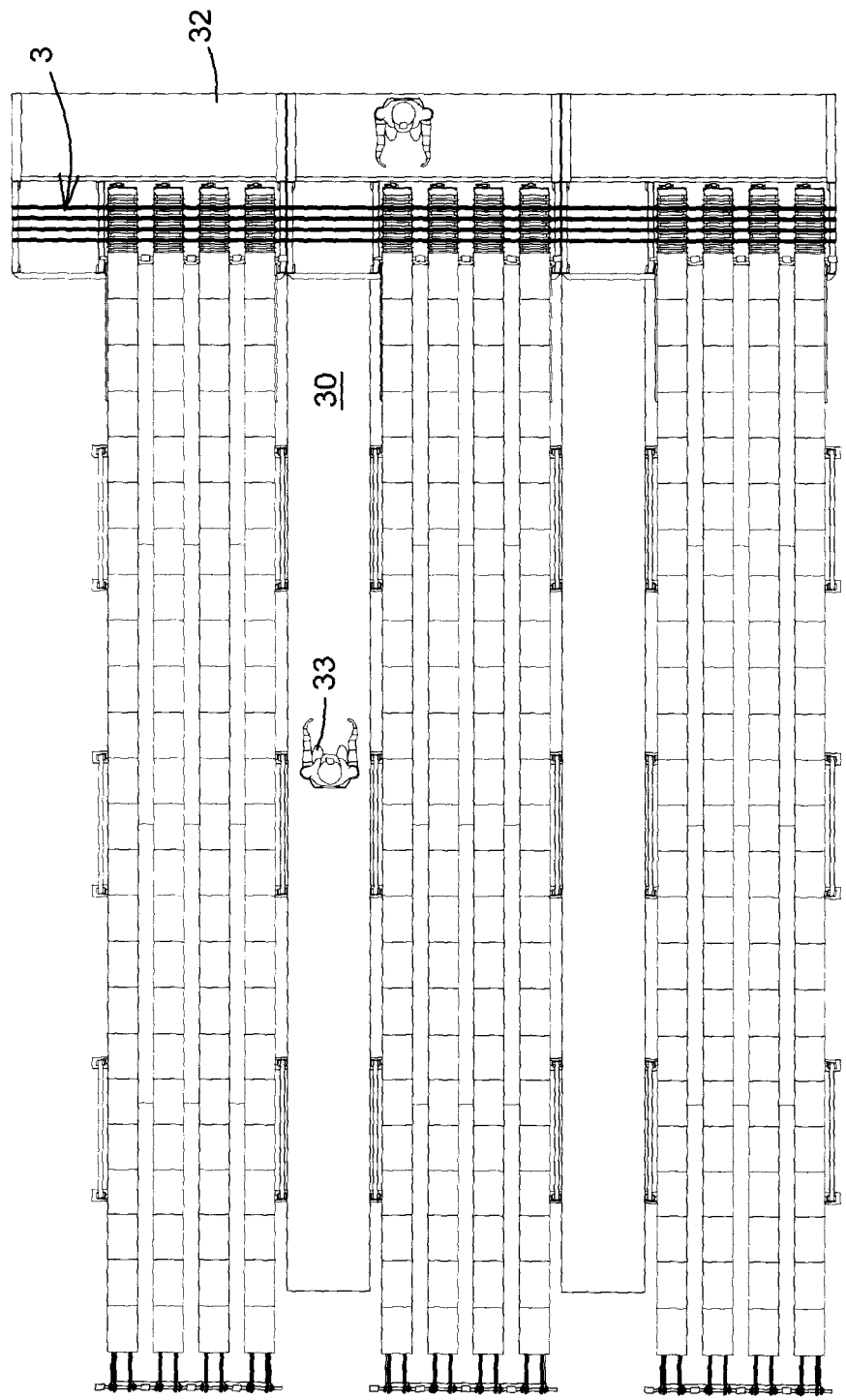

FIG. 14 is an enlarged top plan view of an embodiment of the system with a common input and output conveyor 3, with a person/operator 33 shown on a mezzanine 30 between lane groupings. At one end of the mezzanine is a stair or ladder access (not shown), provided to access each mezzanine level. Mezzanines 30 are also provided along the common input and output conveyor at the same levels as the internal mezzanines, thereby allowing convenient maintenance access to all moving parts of the system.

Figure 15:
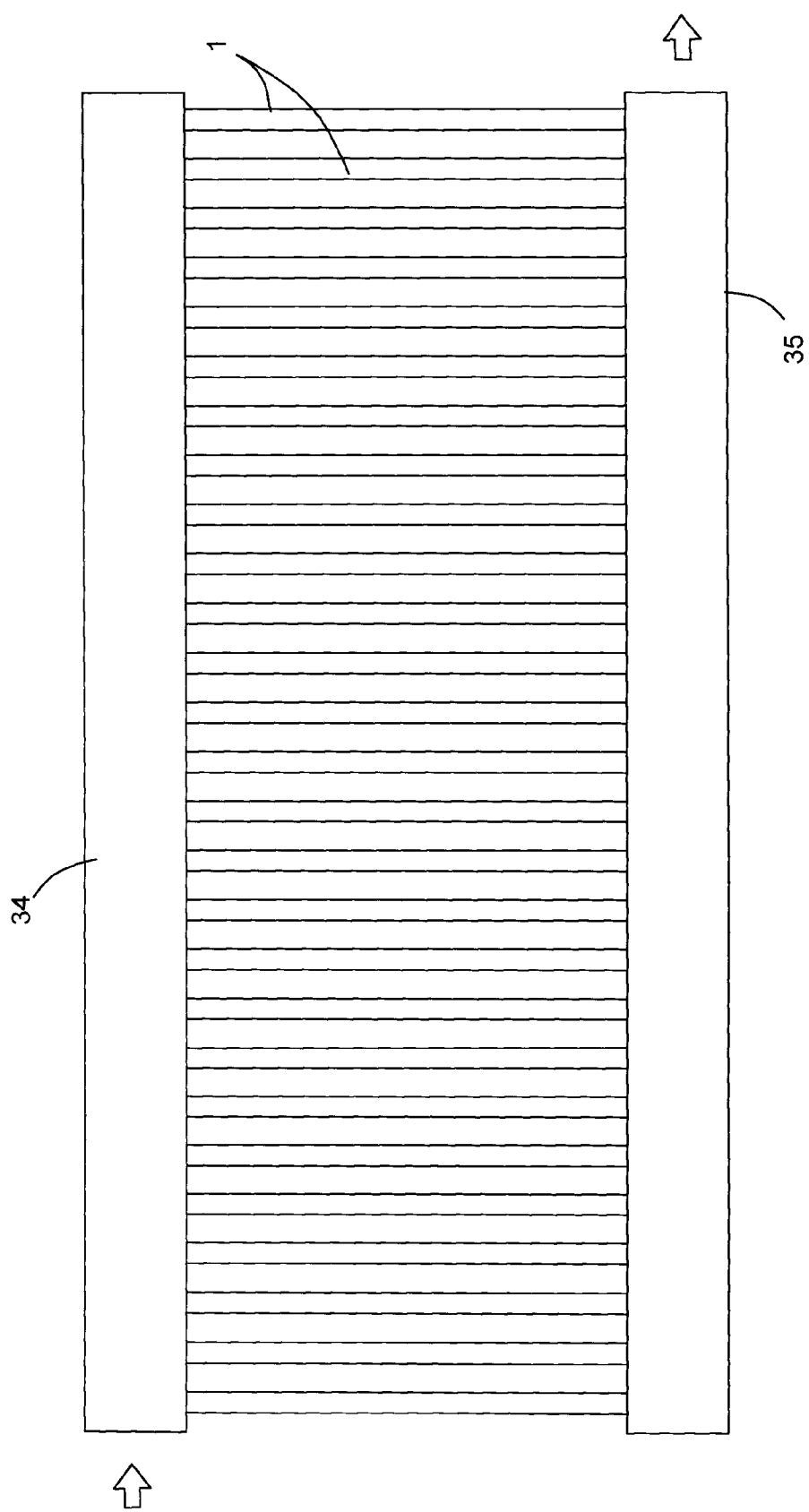

FIG. 15 is a schematic top plan representation of a case buffer conveyor system of the present invention with separate replenishment (input) devices 34 and dispensing (output) devices 35 on either end of the case buffer conveyors j.

Figure 16:
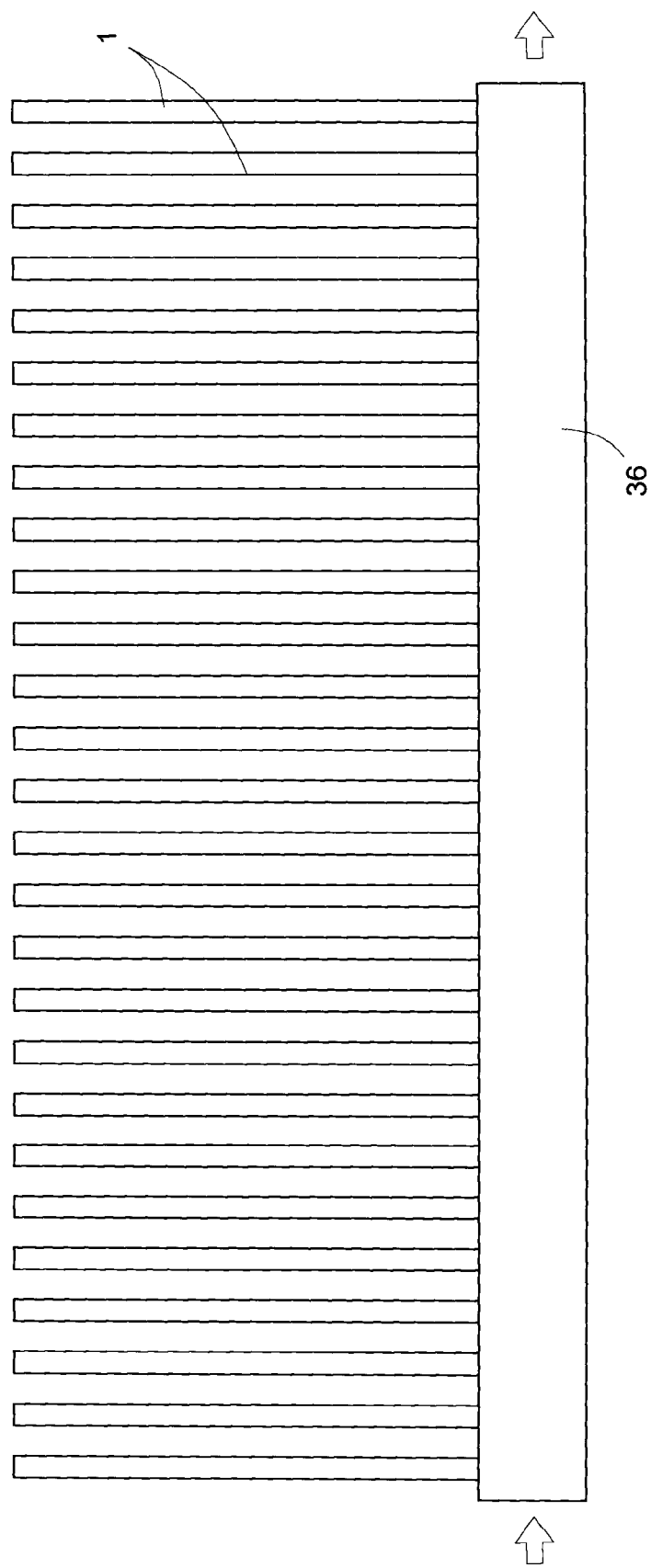

FIG. 16 is a schematic top plan representation of a case buffer conveyor system of the present invention with input and output devices 36 all located on one end of the case buffer conveyors 1.

DETAILED DESCRIPTION OF THE INVENTION

With reference to the annexed drawings the preferred embodiment of the present invention will be herein described for indicative purpose and by no means as of limitation.

Figure 2:
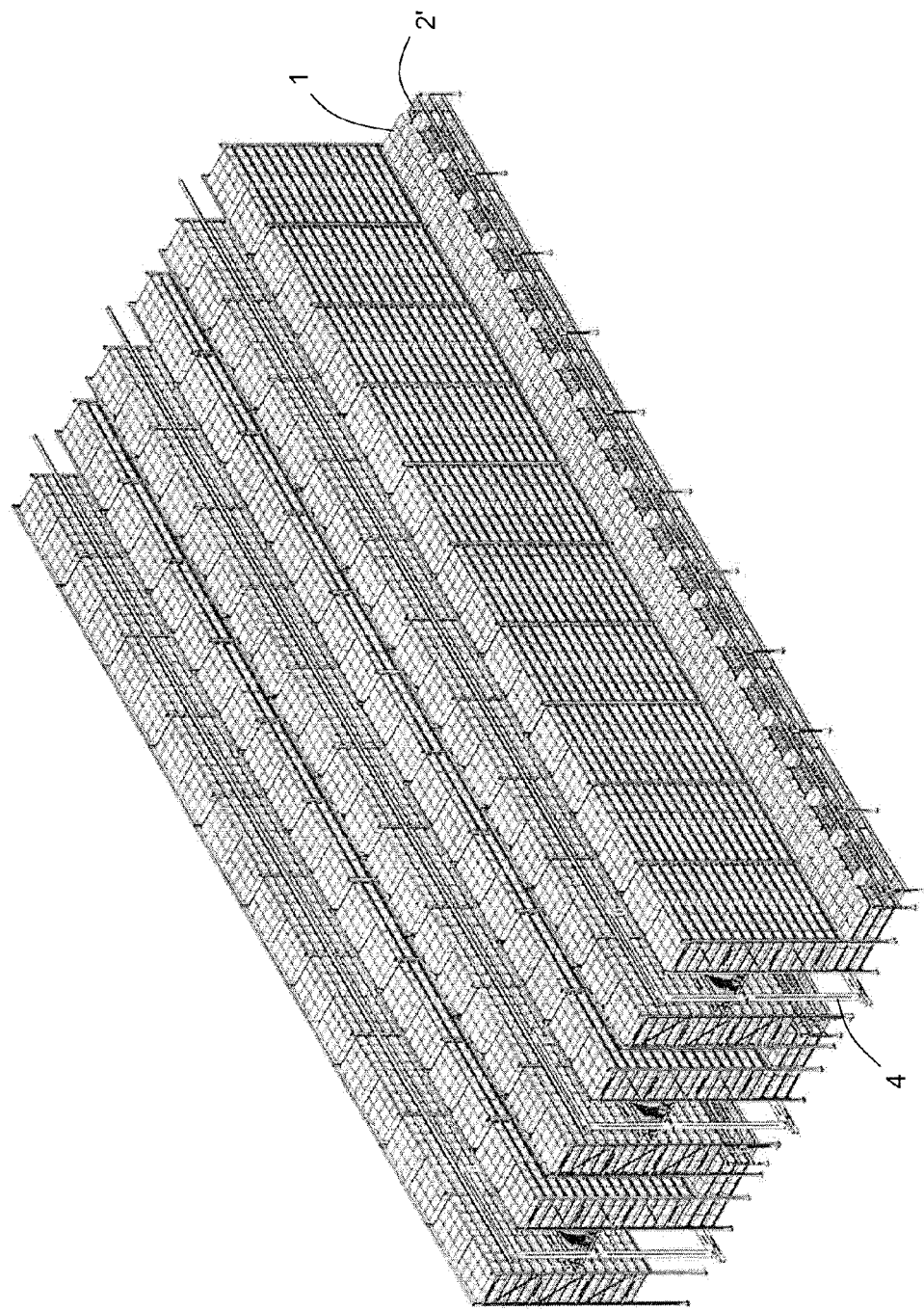
FIG. 2 is a top perspective view showing another embodiment of the overall system that is replenished by cranes 4, and where cases are dispensed out on the output conveyors 2'.
Figure 7:
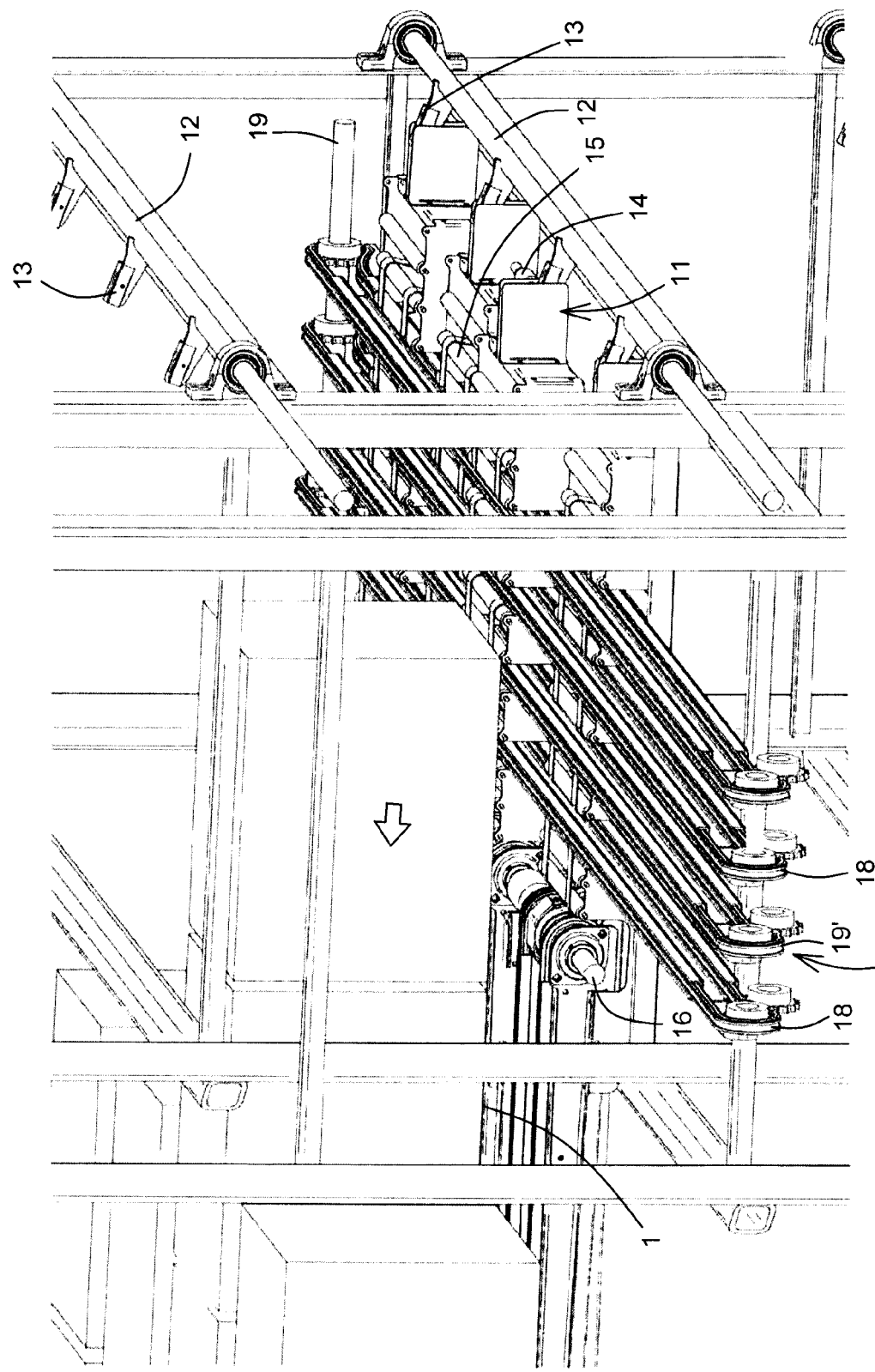
FIG. 7 is a broken enlarged top perspective view showing a dedicated case transfer device 11 replenishing a case from the input transport conveyor to a case buffer conveyor 1 with 1) common lifting apparatus 12 and levers 13 to raise apparatus and thus case.

A system of non-accumulating case conveyors and guides for storing and dispensing cases to fulfill client orders and computerized means to control the operation of said system (as shown in FIGS. 1 and 2), the system comprises:

1) at least one case guide 1 or case buffer conveyor (as shown in FIGS. 1, 1a, 2, 3, 4, 7, and 11), each said case guide comprised of at least one non-accumulating conveyor, each said case guide distributed along the length the sequencing conveyor 2;

2) at least one case dispensing device 11 (as shown in FIGS. 7, 8 and 9), each said dispensing device connecting to the downstream end of said case guide being designated to contain cases of corresponding products;

3) an output sequencing transport conveyor 2' at least temporarily connecting to a downstream end of each said dispensing device 11, wherein an output of said conveyor being the stream of said cases in a predetermined sequence.

One method comprises the steps of:

1) The case guides 1 are spaced at a multiple of a fixed pre-established pitch.

2) Dividing the sequencing conveyor 2, 2' (FIGS. 2 and 3), 3 (FIG. 1A and 9) to a number of virtual case slots corresponding to an established sequence, the length of each slot fixed and corresponding to a multiple of the pre-established pitch between case guides 1.

3) The consequence of the fixed pitch slots and case guide spacings is that if one slot is lined up with a case guide, then all case guides are lined up with slots.

4) When at least one virtual case slot is aligned with at least one case guide containing a case associated with that slot, at least one case is transferred from the case guide 1 to the sequencing conveyor using the dispensing mechanism 11 (FIGS. 8 and 9), until all aligned slots have been filled with their associated cases.

In one embodiment, the case guides are comprised of at least two independently drivable non-accumulating conveyors.

Conveniently, cases never come into direct contact with each other.

In one embodiment, the case guides are individually activated by a clutching system (shown in FIG. 10) connected to a shaft and motor common to a plurality of case guides (as shown in FIGS. 10 and 11). Engagement and disengagement of the clutch system is always done when both the case guide and the common shaft are stopped. This allows for a simple and robust clutching device that is also very precise because this clutching method avoids the need for frictional components that are subject to wear. The energy required to actuate the clutch is thereby also very low.

Conveniently, the common shaft drive engagement device (or clutching system) of FIG. 10 allows a temporary and positive connection to be made between the common shaft and an associated case guide that is not subject to slippage when engaged. A disk 24 with at least one engagement hole or slot 25 is permanently fixed to the common shaft 16. An adjacent drive sprocket 26 contains an engagement pin 27 which when extended engages into hole or slot 25 in said disk 24. The pin is connected to an actuation arm 28 which has a circular hole concentric with the common shaft 16. The pin is constrained within the hole and thus can be moved axially while rotating around the common shaft when engaged. In a preferred embodiment, the actuation arm is actuated by a low-powered solenoid 29 and return spring. If it is desired to engage more than one sprocket, this can be achieved by connecting several sprockets together using a tube that fits over the common shaft but inside of the hole in the actuation arm. This avoids the need for multiple clutching devices within one case guide.

Typically, the case guides are used as metering conveyors to convey cases onto the sequencing conveyor as part of the dispensing method.

Conveniently, the non-accumulating case guide conveyors 1 can be driven in the downstream direction and can also be driven upstream, in the direction of the input transport conveyor 2 (see FIG. 1) as to bring the last case in the case guide in such a position as to pursue loading of the case guide without creating a gap between successive case trains.

in one embodiment, a method further comprises the following steps:

1) Given that an external system must provide replenishment units to fill the case guides, each replenishment unit generally consisting of at least one layer of a production pallet.

2) Given that products of higher velocity will require more frequent replenishment.

3) Given that there is a fixed cost for each replenishment trip.

4) It stands to reason that making fewer replenishment trips by increasing the number of replenishment units per trip should decrease the cost of the replenishment system.

5) The consequence of increasing the number of replenishment units per trip is that more case guides 1 are required to store the additional cases as would be needed if the number of replenishment units used per trip is fixed.

6) A cost benefit calculation is used to determine the optimized number of extra case guides required versus the replenishment system rate requirements to minimize the cost of the overall system.

7) A side effect of this optimization is that there may be a need to have multiple different products in the same case guide at the same time.

Figure 3:
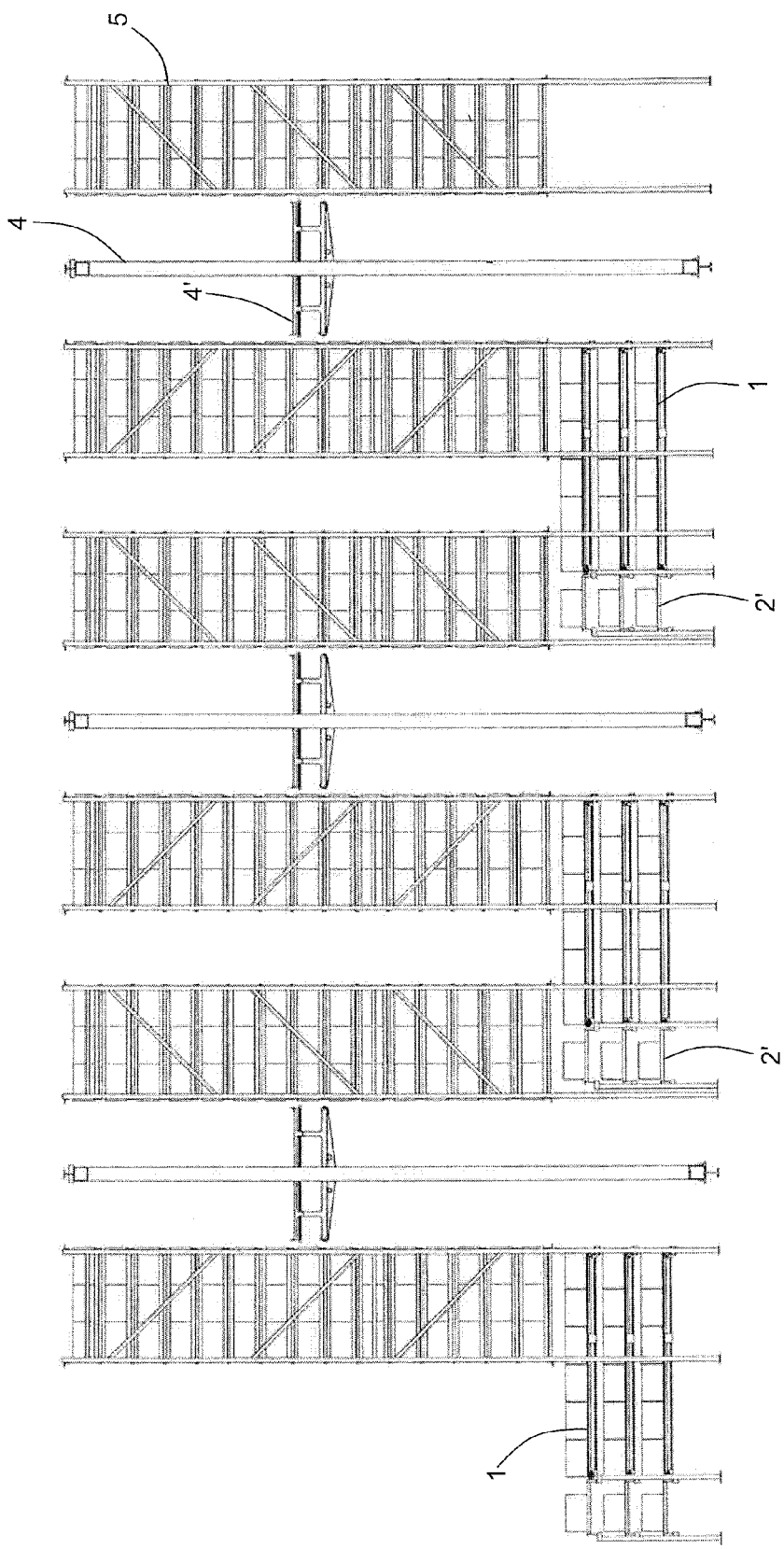
FIG. 3 is a left elevation view of the embodiment of FIG. 2. The cranes 4 store layers of product on shelves 5 and replenish the buffer conveyor 1, one layer quantity at a time. Case order sequences are produced on the output conveyors 2.

In one embodiment, at least one case guide 1 is replenished using a crane-mounted tool 4' temporarily connecting to said case guide (as shown in FIGS. 2 and 3).

In that same embodiment, the method further comprises the following steps:

1) The crane 4 (shown in FIGS. 2 and 3 efficiency can be increased by grouping case guides into zones. Within each created zone, a select number of products are assigned based on their popularity, with the goal of grouping the most popular (high volume) products closest to where the crane picks up its replenishment unit, thereby minimizing crane travel distances. Products can then be dynamically slotted within their respective zones.

In one embodiment (as shown in FIG. 7), an input transport conveyor at least temporarily connecting to an upstream end of at least one case guide.

In one embodiment (as shown in FIG. 7), the system also comprises at least one raisable case transfer device 11, each said transfer device connecting to one case guide 1 and used to discreetly transfer cases from the input transport conveyor 2 to a case guide 1.

Figure 4:
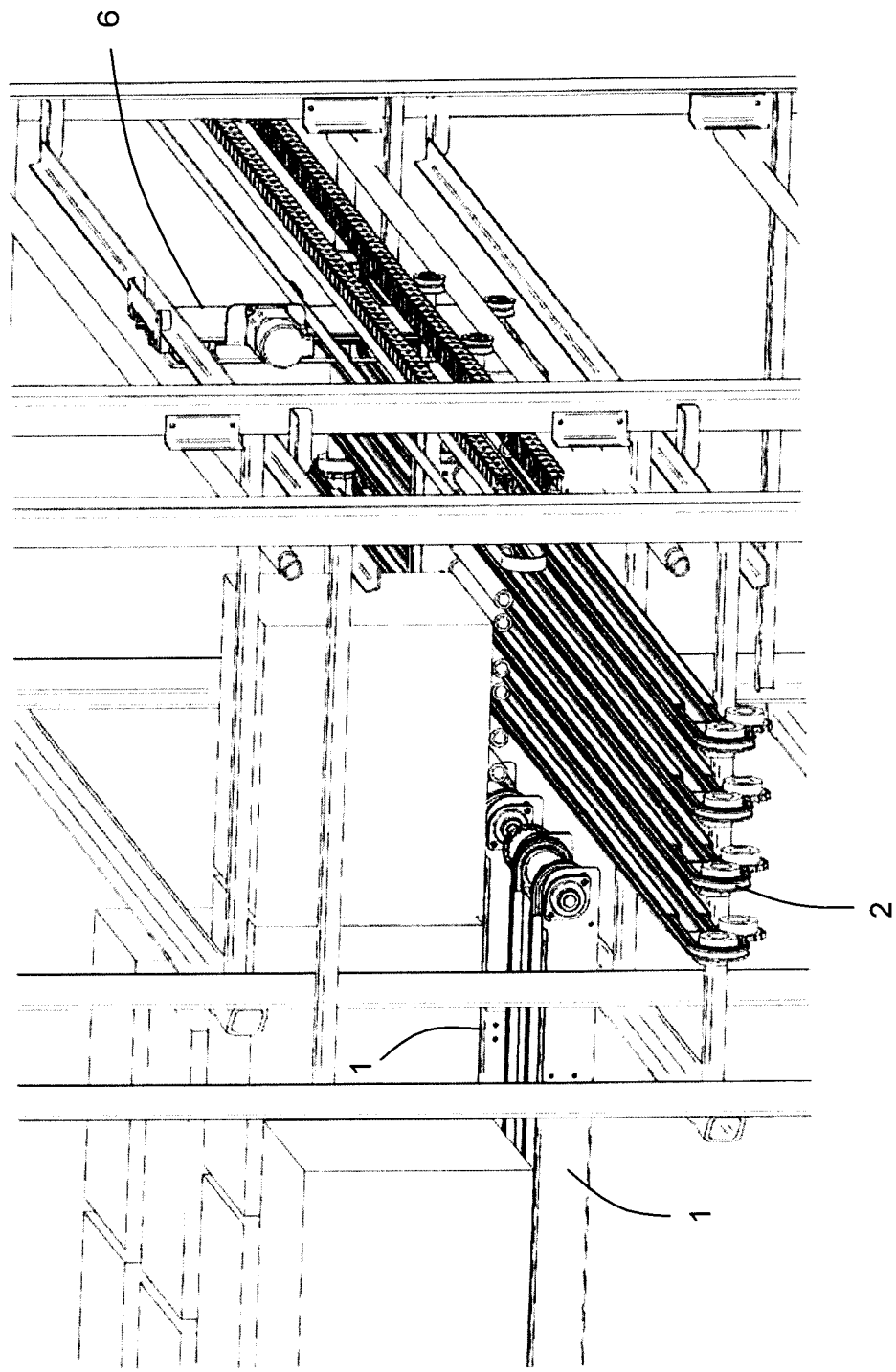
FIG. 4 is a broken enlarged top perspective view showing a displaceable case transfer device 6 (or shuttle) transferring a case into a case buffer conveyor 1, also showing the input conveyor 2 and drive system.
Figure 6:
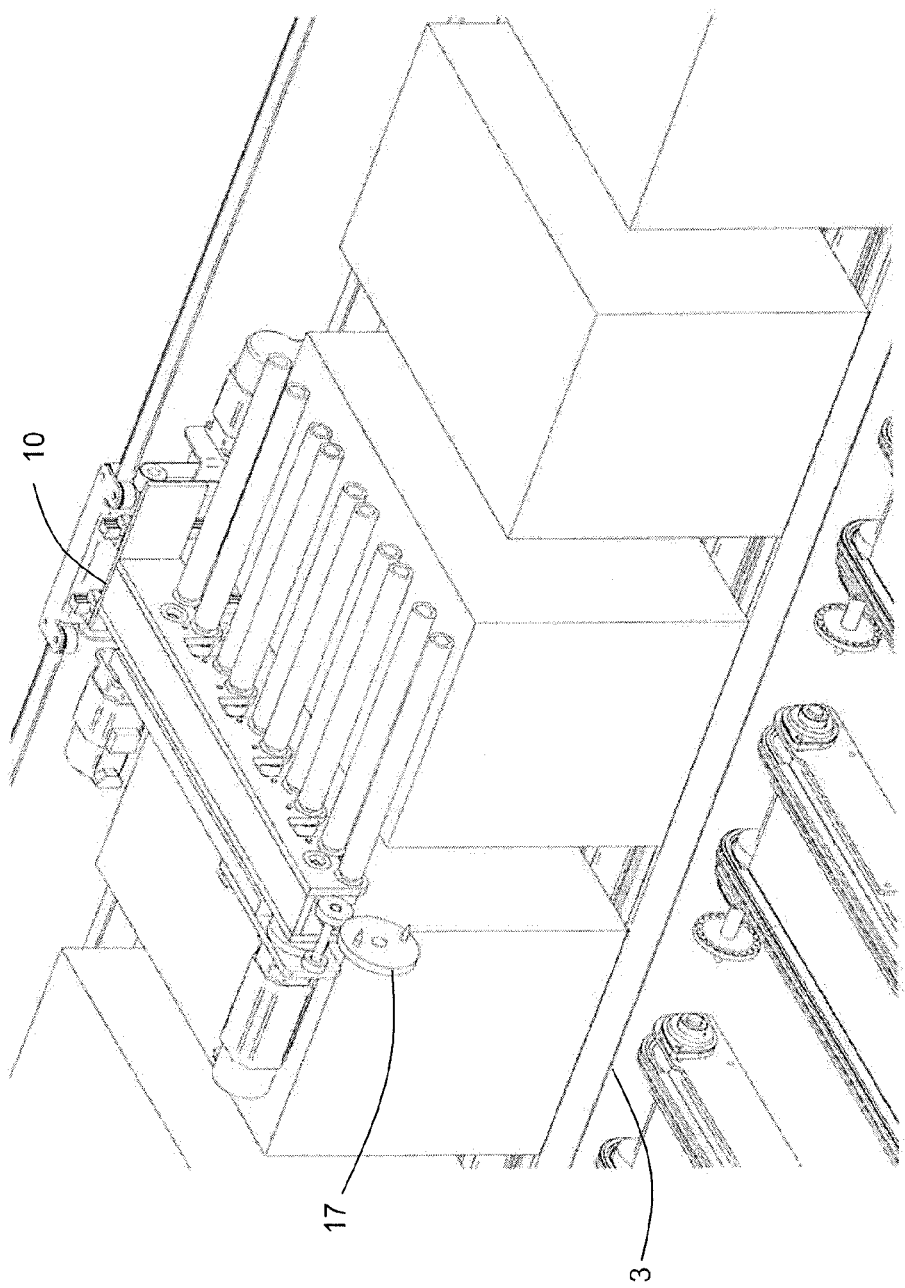
FIG. 6 is a broken enlarged top perspective view showing a displaceable case transfer device 6 with case drive roller subsystem 10 and buffer conveyor drive engagement/clutch mechanism 17 passing over the cases on the input and/or output conveyor 3.

In one embodiment, the system comprises at least one displaceable case transfer device 6 (as shown in FIGS. 4 to 6), each transfer device 6 shared by a plurality of case guides 1, said transfer device temporarily connecting to one case guide at a time to discreetly transfer cases from the input transport conveyor 2 to an adjacent case guide.

1) In order to move between and engage different case guides 1, the engagement device 17 (seen in FIG. 5) is first disengaged from the currently connected case guide by moving the displaceable case transfer device 6 horizontally enough to clear the pin from the engagement hub, then raising the displaceable case transfer device 6, moving close to the target case guide, lowering the displaceable case transfer device 6, and moving horizontally a short distance to engage the pin onto the target case guide hub 17' (as shown on FIGS. 5 and 11).

2) On the displaceable case transfer device 6 there is an actuating mechanism that is used to drive the case guide in order to load a case onto it. The case guide has a shaft that extends from the upstream end of the case guide, on which a disc with multiple engagement holes is mounted 17' (as shown on FIGS. 5 and 11. On the displaceable case transfer device 6 is a hub with pins which can engage into the holes of the case guide-mounted disc 17', and thereby transmit a driving force from the displaceable case transfer device 6 to the case guide. When torque is applied, a reaction force is created; the effect of this force on the displaceable case transfer device 6 is minimized by using a long lever arm which extends from the engagement point, across the input transport conveyor and close to the displaceable case transfer device 6 guide rails. The other end of the lever arm (away from the engagement end), is connected to the displaceable case transfer device 6 through a pivot point that is connected to a short linear guide which permits vertical and horizontal axes of freedom at the engagement hub 17.

3) The horizontal degree of freedom is required to compensate for the different positions of the case buffer drive system (7' in FIG. 11) in the case guides if they are used to adjust for chain tension and stretch. This is provided by the short linear guide, held in a nominal position using a passive spring-centering device. The engagement device 17 has several features allowing self-alignment of the two parts. Those features are a tapered alignment hub 17' and tapered engagement pins.

4) The vertical degree of freedom is required because while the engagement device 17 is engaged, the displaceable case transfer device 6 must move up and down in order to transfer a case into the guide.

FIG. 15 shows a schematic top plan representation of a case buffer conveyor system of the present invention with separate 2D-replenishment (input) device(s) 34 and 2D-dispensing (output) device(s) 35 on either end of the case buffer conveyors 1.

Figure 1A:
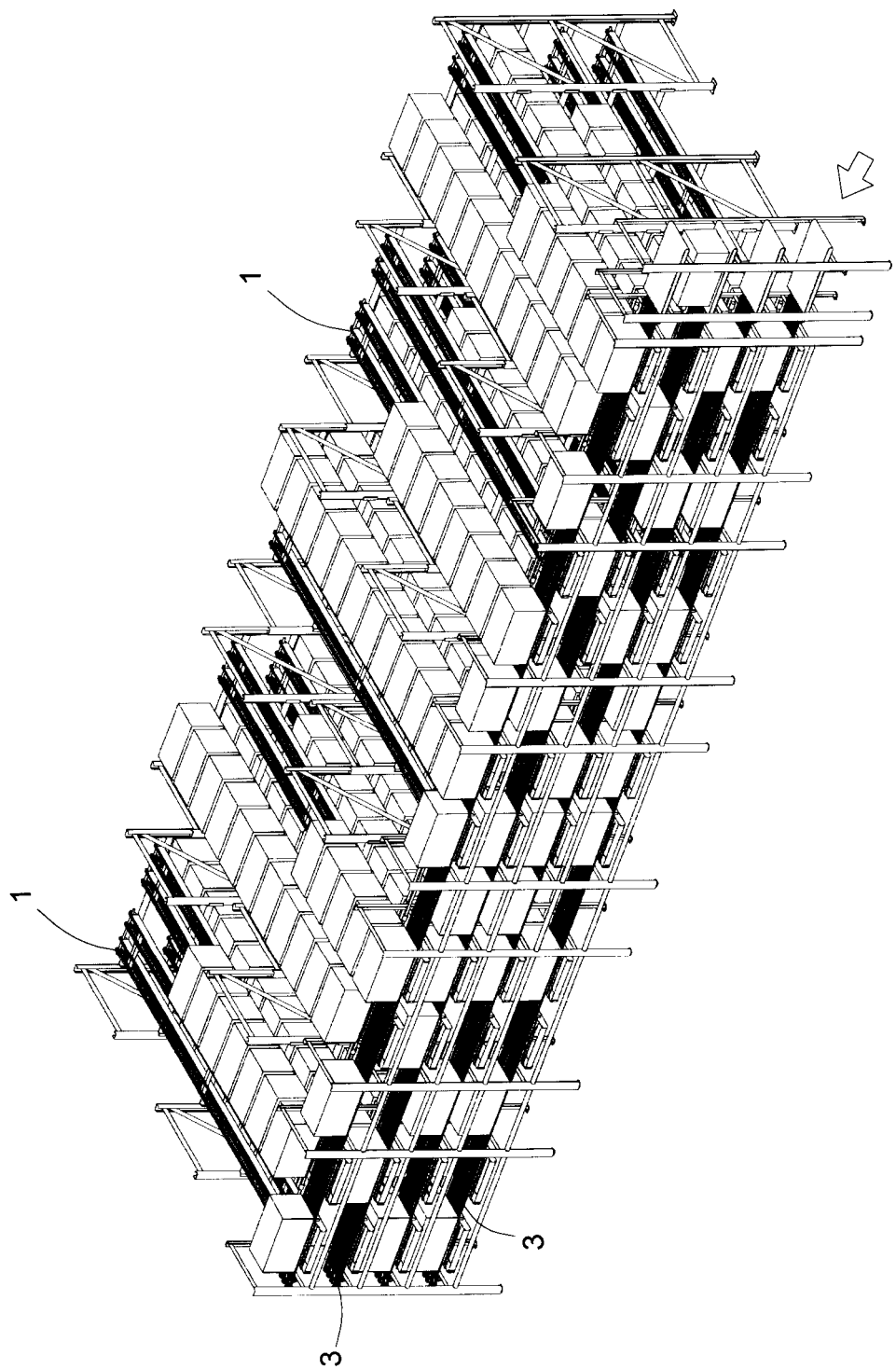
FIG 1A is a top perspective view of another embodiment of the overall system where the case buffer conveyors 1 are replenished from and dispensed onto a common input and output conveyor 3. This particular system is for an application with 40 lanes on 4 levels that could be used as a product sorter for a smaller number of products than typically found in order preparation systems. The arrangement with the common input and output conveyor 3 illustrated here would be implemented in a similar fashion in an order preparation application with more lanes, and longer lanes.

In one embodiment, according to the system of FIG. 16 (seen in a top plan view) the displaceable case transfer device (generally shown at 36) is bi-directional, this allows it to perform both input and output functions. The common input and output conveyor 3 (as seen in FIG. 1A) conveys input cases to the end of a case buffer conveyor 1 that requires replenishment, and the displaceable case transfer device 6 transfers cases to the case buffer conveyor 1. The displaceable case transfer device 6 also transfers cases out of the buffer conveyors onto the common input and output conveyor 3 that then conveys the order sequence cases to the output. The case buffer conveyors 1 can be driven by the displaceable case transfer device 6, or the case buffer conveyors can be driven by a common drive shaft 16 (as shown in FIG. 7).

In one embodiment, according to system of FIG. 16, the 2D displaceable case transfer device (generally shown at 36) can both perform input and output functions, as described in the previous embodiment and it can also travel vertically, such that it can service an input and output conveyor 3 similar to the input and output dedicated to one horizontal level shown in FIG. 1A but shared (note that the shared embodiment is not illustrated) between a plurality of horizontal levels of a plurality of case buffer conveyors arranged vertically one above the other. For example, the shared input and output conveyor can be located at the end of the lowest level of case buffers, input cases are conveyed to a pick up point where the 2D displaceable case transfer device picks it up and moves vertically upwards to the appropriate level and horizontally to align with the end of the case buffer 1 that requires replenishment and then transfers the input case into the case buffer 1. The displaceable case transfer device can also position itself at the end of a buffer conveyor, transfer a case unto itself, move vertically downwards to the input and output conveyor and then transfer an output case to the appropriate location on the shared input output conveyor that then conveys the order sequence cases to the output. The case buffer conveyors can be driven by the displaceable case transfer device, or the case buffers can be driven by a common drive shaft 16 (as shown in FIG. 7) per horizontal level.

In one embodiment, according to system of FIG. 16, the displaceable case transfer device can both perform input and output functions, as described in the previous embodiment and it can also travel vertically, such that it can service a plurality of horizontal levels of a plurality of case buffer conveyors arranged vertically one above the other. In this embodiment there is no input and output conveyor, input cases are conveyed to a pick up point where the displaceable case transfer device picks it up and moves vertically upwards to the appropriate level and horizontally to align with the end of the case buffer that requires replenishment and then transfers the input case into the case buffer. The displaceable case transfer device can also position itself at the end of a buffer conveyor, transfer a case unto itself, move vertically downwards to the input and output conveyor and then transfer an output case to the output position. The case buffer conveyors can be driven by the displaceable case transfer device, or the case buffers can be driven by a common drive shaft per horizontal level.

In one embodiment, a method further comprises the following steps of:

1. The case guides are spaced at a multiple of a fixed pre-established pitch.

2. Dividing the input transport conveyor 2 (as shown in FIG. 1) into a number of virtual case slots corresponding to an established sequence, the length of each slot fixed and corresponding to a multiple of the pre-established pitch between case guides 1.

3. The consequence of the fixed pitch slots and case guide spacings is that if one slot is lined up with a case guide 1, then all case guides 1 are lined up with slots.

4. When at least one virtual case slot is aligned with at least one case guide 1 for which the case is destined, at least one case is transferred from the input transport conveyor 2 to the case guide using a replenishment mechanism similar to the displaceable case transfer mechanism of FIGS. 4 to 6, until all case guides are filled with their associated cases.

In one embodiment, the method further comprises the steps of:

1) Conveying cases on the input transport conveyor 2 (as shown in FIG.1) in either long side or short side leading orientation.

2) Storing cases in the case guides 1 in either long side or short side leading orientation.

3) Dispensing and conveying on the non-accumulating sequence conveyor 2' in either long side or short side leading orientation.

4) This method allows for maximizing the storage density of the case guides.

Conveniently, cases can be transported to and from the input and output conveyors using vertical indexing conveyors (not illustrated).

Conveniently, the non-accumulating case guide 1 can dispense cases onto any traditional merge, such as 90 degree pinwheel or spur (not illustrated), as well as on case transfer devices 11 that can be non-powered (as shown in FIG. 8) or powered as shown in FIG. 9), as described herein.

In one embodiment, according to the system of FIG. 16, a bidirectional case loading and dispensing system 36 is comprised of a conveyor joining one end of a plurality of case guides, each conveyor provided with the necessary mechanisms to both load and dispense from the case guides, and where each case guide 1 can be driven in both directions.

Conveniently, mezzanines 30 located between groups of buffer conveyors provide access as shown FIGS. 12 and 13.

In one embodiment, illustrated in FIG. 1A, and according to the system of FIG. 16, a single common conveyor per horizontal level used for both input and output of cases, through dedicated loaders-dispensers 11 or combination of dispensers 11 and shuttles 6. A case guide can therefore be driven in one direction for loading, and the other direction for dispensing.

FIG. 14 shows how this embodiment improves the access as the mezzanines 30 between groups of buffer conveyors can be accessed readily from the open end of the arrangement, because the buffer conveyors 1 are only joined by the input and output conveyor 3 at the other end.

There are two methods for inputting and outputting cases:

1) Dedicated non-powered case transfer device 11 for dispensing as shown in FIG. 8 in conjunction with a shuttle (not illustrated) that uses a pushing device for loading that would operate in masked time (as known in the art).

2) Use dedicated powered case transfer devices 11 for dispensing as shown in FIG. 9, to both load and dispense cases.

Use of a common drive shaft 16 with clutching mechanism of FIG. 10 could be used at both ends of the case guides 1 in order to increase the capacity of the system.

The bi-directionality of the case guide 1 in combination with at least one common input-output conveyor 3 allows the ability to sort, re-sequence or extract any of the cases in the system without bringing the unneeded cases completely out of the system.

One method takes advantage of the bi-directionality of the case guides to enable the dispensing of any case currently stored in a case guide where a needed case is not at the front of the case guide, by simply dispensing the cases in front of the needed case and reinserting them back into the same or another case guide, while exiting the needed case. This can be achieved by using individual case guides as random access buffers, where one or more case guides can be used to dispense any case by following these steps:

1) One or more case guides containing the target cases dispense cases on the common conveyor until the target case or cases have been dispensed.

2) Each dispensed case, moves downstream on the common conveyor until it faces its designated case guide and is then loaded onto that case guide. Each receiving case guide, if it is full, dispenses a case onto the other common conveyor in a similar but mirror action.

3) The end result is that only the target case or cases remain on the common conveyors.

4) The case or cases can now be conveyed out of the system.

This method has the following advantages:

1) Minimizes the output rate penalty while allowing many more skus to be stored in the same hardware. This method also increases the percentage (%) utilisation of the available case locations.

2) Allows the storing and buffering of more than one product in a case guide.

3) This lowers the overall output capacity but increases the number of unique products that can be stored; this is desired for lower velocity products.

4) One of the features of this method which makes it feasible is the gentle handling of cases because each case may undergo significant travel within the system before being finally dispensed out of the system. The system features no collisions and no pressure between cases and there is no dynamic deformation of the bottom surface as is found on conventional roller conveyor.

1) There are no collisions and no pressure between cases.

2) System can be used for broken case picking, since cases can be re-introduced into the system after being extracted. Advantages include very high density and high rates compared to mini-load AS/RS cranes.

If the case output sequence is at least partially known in advance, the replenishment of the case guides can be done to match this sequence as closely as possible within the constraints of the number of case guides and the minimum quantity of cases of each product replenished. The individual case guides can be loaded in such a way as to create short, ordered sequences and therefore maximize the opportunity for wave picking from the upstream replenishment sub-system.

The combinations of sub-systems described above that provide bi-directionality allow for higher rates and more flexibility when applying the methods described.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinafter claimed.

The invention claimed is:

1. A system of non-accumulating case conveyors and guides for storing and selectively dispensing cases of products according to predetermined order sequences, the system comprising:
    a plurality of non-accumulating buffer conveyors being substantially parallel to one another for accumulating at least one case of a respective said products;
    an output sequencing transport conveyor being locally substantially perpendicular to a respective downstream end of the non-accumulating buffer conveyors for sequentially transferring cases of the products therefrom;
    for each said plurality of non-accumulating buffer conveyors, a case transfer device connecting to the downstream end of respective said non-accumulating buffer conveyor for selectively transferring a case of the products therefrom, each said case transfer device having a respective downstream end thereof connecting to the output sequencing transport conveyor for selectively transferring the corresponding case of products thereon;
    a controller unit connecting to the plurality of non-accumulating buffer conveyors, the plurality of case transfer devices and the output sequencing transport conveyor to control respective operation thereof so as to allow the forming of the predetermined order sequences of cases of products on the output sequencing transport conveyor from the cases of respective products from the plurality of the non-accumulating buffer conveyors;
    wherein each said conveyor is a powered conveyor for respective selective activation thereof by the controller unit, and each said non-accumulating buffer conveyor includes a clutch mechanism for selective activation thereof by the controller unit, each said clutch mechanism connecting to a common drive shaft controlled by the controller unit; and
    wherein said controller unit further stopping rotation of the common drive shaft; disengaging corresponding one said clutch mechanism from a currently engaged one of said plurality of buffer conveyors and corresponding said case transfer device; engaging corresponding one said clutch mechanism for engaging another one of said plurality of buffer conveyors with corresponding said case transfer device; and rotating the common drive shaft to operate said another one of said plurality of buffer conveyors with corresponding said case transfer device to transfer a case of product in or out thereof.

2. The system of claim 1, wherein each said case transfer device includes a plurality of raisable non-powered rollers being actuatable by the controller unit for selective discreet transfer of respective cases of products.

3. The system of claim 1, wherein each said case transfer device includes a raisable powered transfer mechanism being actuatable by the controller unit for displacement thereof so as to allow selective discreet transfer of respective cases of products therewith.

4. The system of claim 3, wherein said powered transfer mechanism selectively connects to respective said non-accumulating buffer conveyor when in a raised position for activation thereby so as to allow simultaneous operation thereof.

5. The system of claim 4, wherein said output sequencing transport conveyor is an input/output transport conveyor and each said case transfer device is further used to transfer cases of the products onto corresponding said non-accumulating buffer conveyor, each said case transfer device and corresponding said non-accumulating buffer conveyor being activatable in reverse direction for subsequently storing cases of products on corresponding said non-accumulating buffer conveyor and dispensing said cases of products therefrom.

6. The system of claim 1, further including:
    an input transport conveyor being locally substantially perpendicular to a respective upstream end of the non-accumulating buffer conveyors for sequentially transferring cases of the products thereto;
    a case replenishment apparatus selectively connecting to the upstream end of respective said non-accumulating buffer conveyor for transferring a case of the products thereon, said case replenishment apparatus having a upstream end thereof connecting to the input transport conveyor for selectively transferring the corresponding case of products therefrom, the controller unit connecting to the case replenishment apparatus to control operation thereof.

7. The system of claim 6, wherein said case replenishment apparatus is displaceable along the input transport conveyor selectively connecting to the upstream end of each said non-accumulating buffer conveyor for transferring a case of the products thereon.

8. The system of claim 6, wherein said system includes, for each said plurality of buffer conveyors, a corresponding said case replenishment apparatus connecting to the upstream end of corresponding said non-accumulating buffer conveyor for transferring a case of the products thereon.

9. The system of claim 7, wherein each said non-accumulating buffer conveyor includes an input clutch mechanism for selective activation thereof by the controller unit.

10. The system of claim 9, wherein each said input clutch mechanism connects to a common input drive shaft controlled by the controller unit.

11. A method for the replenishment of a plurality of buffer conveyors with cases of one of a plurality of products, each said buffer conveyor having cases of a respective one said plurality of products thereon for a selective output of said cases onto an output device according to predetermined order sequences, the method comprising the steps of:
  a) queuing one said buffer conveyor onto a list of empty ones of said buffer conveyors available for replenishment by cases of one of the plurality of products after said one said buffer conveyor dispenses a last one of the cases located thereon;
  b) determining a next one of said plurality of products required to be stored on at least one said empty buffer conveyor from the list, said next one of said plurality of products being determined based on predetermined batches of cases;
  c) adding a replenishment quantity of cases of said next one of said products;
  d) selecting said at least one said empty buffer conveyor from the list for replenishment thereof with cases of said next one of said plurality of products.

12. The method of claim 11, wherein the replenishment quantity of cases of said next one of said products typically consists of an even number of layers of cases of a production pallet of a stock keeping unit.

13. The method of claim 11, wherein each said conveyor is replenished from an upstream end thereof using an input case transfer device, and wherein each said conveyor is dispensed from a downstream end thereof using an output case transfer device.

14. The method of claim 13, wherein each said input case transfer device is fixed and/or displaceable relative to each said conveyor, and wherein each said output case transfer device is fixed and/or displaceable relative to each said conveyor.

15. The method of claim 11, wherein each said conveyor is both replenished with and dispensed of cases of a corresponding one of the plurality of products at a same end thereof using a powered case transfer device.

16. The method of claim 15, wherein said powered case transfer device is fixed relative and respective to each said conveyor.

17. The method of claim 15, wherein said powered case transfer device is displaceable relative to each said conveyor.

18. The method of claim 17, wherein the conveyors are non accumulating conveyors, and wherein said displaceable powered case transfer device powers said non-accumulating buffer conveyor it temporarily connects to when transferring a case therewith.

19. The method of claim 17, wherein said powered case transfer device is vertically and/or horizontally displaceable relative to each said buffer conveyor.

20. The method of claim 11, wherein the conveyors are non-accumulating conveyors.

21. The method of claim 20, wherein at most one of said at least two buffer conveyors is selectively engaged by a common power mechanism at a time for transferring a case of product in or out thereof.

22. The method of claim 21, wherein the output device includes a case transfer device and a sequence conveyor, and wherein, when more than one said buffer conveyors are simultaneously aligned with a respective target location of the sequence conveyor, the sequence conveyor completely stops during transferring of the case of product between the sequence conveyor and each said aligned buffer conveyor.

23. The method of claim 21, wherein the output device includes a case transfer device and a sequence conveyor, and wherein, when one said buffer conveyor is aligned with a corresponding target location of the sequence conveyor, the sequence conveyor completely stops during transferring of the case of product between the sequence conveyor and said aligned buffer conveyor.

24. The method of claim 23, wherein said buffer conveyors are substantially parallel to one another and spaced from one another by a predetermined pitch distance, the sequence conveyor being longitudinally divided into a plurality of target locations positioned in an end-to-end relationship relative to one another, each said target location having a length substantially equal to the predetermined pitch distance.

25. A method for storing cases of products on a plurality of powered non-accumulating buffer conveyors being substantially parallel to one another, and selectively dispensing the cases of products according to predetermined order sequences, each said buffer conveyor accumulating at least one case of a respective said products, and wherein at least two of said buffer conveyors connect to a common drive shaft selectively engaging said at least one buffer conveyor located along a shaft axis, said method, for storing or selectively dispensing the cases of products, comprising the steps of:
  1) stopping rotation of the common drive shaft;
  2) disengaging a clutch from a currently engaged one of said at least two buffer conveyors;
  3) engaging a clutch for engaging another one of said at least two buffer conveyors; and
  4) rotating the common drive shaft to operate another one of said at least two buffer conveyors to transfer a case of product in or out thereof.

26. The method of claim 25, wherein the common drive shaft is a conveyor common drive shaft, and, for each said buffer conveyor, a powered case transfer device connecting to the downstream end of respective said buffer conveyor for selectively transferring a case of the products therefrom onto the output device, a common power mechanism including a transfer common drive shaft connecting to said case transfer devices corresponding to said at least two buffer conveyors.

27. The method of claim 25, wherein a powered case transfer device mechanically connects to the downstream end of respective said buffer conveyor for selectively transferring a case of the products therefrom onto the output device, said common drive shaft connecting to said case transfer devices via corresponding one said at least two buffer conveyors, and wherein steps 2), 3), and 4) comprising, respectively:

2) disengaging a clutch from a currently engaged one of said at least two buffer conveyors and corresponding said case transfer device;
3) engaging a clutch for engaging another one of said at least two buffer conveyors with corresponding said case transfer device; and
4) rotating the common drive shaft to operate said another one of said at least two buffer conveyors with corresponding said case transfer device to transfer a case of product in or out thereof.

28. A method for storing cases of products on a plurality of powered non-accumulating buffer conveyors being substantially parallel to one another, and selectively dispensing the cases of products onto a powered output sequencing transport conveyor according to predetermined order sequences, each said buffer conveyor accumulating at least one case of a respective said products, the output sequencing transport conveyor being locally substantially perpendicular to a respective downstream end of the at least one non-accumulating buffer conveyors for sequential transferring of cases of the products therefrom using, for each said plurality of buffer conveyors, a powered case transfer device connecting to the downstream end of respective said at least one non-accumulating buffer conveyor for selectively transferring a case of the products therefrom, each said case transfer device having a respective downstream end thereof connecting to the output sequencing transport conveyor for selectively transferring the corresponding case of products thereon, the method comprising, for dispensing each predetermined order sequence of cases of products, the steps of:
  a) for each case of the predetermined order sequence, deactivating the output sequencing transport conveyor when a pre-assigned empty location for receiving a predetermined one of the cases of product thereon is aligned with a corresponding one of the at least one non-accumulating buffer conveyor having the predetermined one of the cases of product stored thereon;
  b) activating the corresponding one of the at least one non-accumulating buffer conveyor and the corresponding case transfer device for transferring the predetermined one of the cases of product on the pre-assigned empty location of the output sequencing transport conveyor;
  c) deactivating the corresponding one of the at least one non-accumulating buffer conveyor and the corresponding case transfer device;
  d) activating the output sequencing transport conveyor until a second pre-assigned empty location for receiving a predetermined one of the cases of product thereon is aligned with a corresponding one of the at least one non-accumulating buffer conveyor having the predetermined one of the cases of product stored thereon.

29. The method of claim 28, wherein the output sequencing transport conveyor is an input/output transport conveyor and each said case transfer device is further used to transfer cases of the products onto corresponding said at least one non-accumulating buffer conveyor, each said case transfer device and corresponding said at least one non-accumulating buffer conveyor being activatable in reverse direction for subsequently storing cases of products on corresponding said at least one non-accumulating buffer conveyor and dispensing said cases of products therefrom, the method further including the following steps:
  c1) activating the input/output transport conveyor;
  c2) deactivating the input/output transport conveyor when a pre-assigned used location carrying a predetermined one of the cases of product thereon is aligned with a corresponding one of the at least one non-accumulating buffer conveyor assigned to have the predetermined one of the cases of product stored thereon;
  c3) activating the corresponding one of the at least one non-accumulating buffer conveyor and the corresponding case transfer device in reverse direction for transferring the predetermined one of the cases of product on the pre-assigned used location of the input/output transport conveyor onto the corresponding one of the at least one non-accumulating buffer conveyor, the pre-assigned used location of the input/output transport conveyor becoming another pre-assigned empty location thereof for receiving a predetermined one of the cases of product thereon;
  c4) deactivating the corresponding one of the at least one non-accumulating buffer conveyor and the corresponding case transfer device.

30. The method of claim 29, wherein the steps c1) to c4) are repeated at least once more before step d) is performed.

* * * * *